United States Patent
Arshad et al.

(10) Patent No.: US 11,479,702 B2
(45) Date of Patent: Oct. 25, 2022

(54) HYDROPHILIC AND HYDROPHOBIC SUPERPARAMAGNETIC $FE_3O_4$ NANOPARTICLES AS $T_2$-CONTRAST AGENTS FOR OIL RESERVOIR APPLICATIONS

(71) Applicant: King Fahd University of Petroleum and Minerals, Dhahran (SA)

(72) Inventors: Shahid Ali Muhammad Arshad, Dhahran (SA); Safyan A. Khan, Dhahran (SA); Mohamed A. Morsy, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 952 days.

(21) Appl. No.: 16/252,076

(22) Filed: Jan. 18, 2019

(65) Prior Publication Data

US 2020/0231858 A1    Jul. 23, 2020

(51) Int. Cl.
| | |
|---|---|
| *H01F 1/00* | (2006.01) |
| *H01F 1/06* | (2006.01) |
| *C09K 8/03* | (2006.01) |
| *E21B 47/13* | (2012.01) |
| *B82Y 30/00* | (2011.01) |

(Continued)

(52) U.S. Cl.
CPC ................ *C09K 8/03* (2013.01); *B82Y 30/00* (2013.01); *E21B 47/13* (2020.05); *E21B 49/00* (2013.01); *H01F 1/0018* (2013.01); *H01F 1/0054* (2013.01); *B82Y 15/00* (2013.01); *C09K 2208/10* (2013.01)

(58) Field of Classification Search
CPC .... H01F 1/0054; H01F 1/0018; H01F 1/0045; H01F 1/06; H01F 1/061; H01F 1/00; H01F 1/445; H01F 1/20
See application file for complete search history.

(56) References Cited

U.S. PATENT DOCUMENTS

| | | |
|---|---|---|
| 8,383,085 B2 | 2/2013 | Hegmann et al. |
| 8,828,357 B2 | 9/2014 | Lee et al. |

(Continued)

FOREIGN PATENT DOCUMENTS

| | | |
|---|---|---|
| CN | 104784712 A | 7/2015 |
| CN | 107050452 A | 8/2017 |
| WO | 2014123672 A1 | 8/2014 |

OTHER PUBLICATIONS

Kandasamy et al., "Recent advances in superparamagnetic iron oxide nanoparticles (SPIONs) for in vitro and in vivo cancer nanotheranostics", Oct. 28, 2015, International Journal of Pharmaceutics, 496, pp. 191-218. (Year: 2015).*

(Continued)

*Primary Examiner* — Matthew E. Hoban
*Assistant Examiner* — Lynne Edmondson
(74) *Attorney, Agent, or Firm* — Oblon, McClelland, Maier & Neustadt, L.L.P.

(57) ABSTRACT

The invention is directed to hydrophilic and hydrophobic superparamagnetic nanoparticles and their use as contrast agents for NMR including agents that distinguish oil and water in NMR logging of geological formations containing oil or water. Methods of making these SPIONs are also described.

6 Claims, 21 Drawing Sheets

(51) Int. Cl.
*E21B 49/00* (2006.01)
*B82Y 15/00* (2011.01)

(56) References Cited

U.S. PATENT DOCUMENTS

2015/0335767 A1* 11/2015 Yung ................... C12N 5/0623
424/9.32
2017/0266670 A1 9/2017 Stein

OTHER PUBLICATIONS

Wang et al., "One-pot synthesis of water-soluble superparamagnetic iron oxide nanoparticles and their MRI contrast effects in mouse brains", Dec. 9, 2014, Materials Science and Engineering C 48, pp. 416-423. (Year: 2014).*
Qi et al., "Superparamagnetic Fe3O4 nanoparticles: synthesis by a solvothermal process and functionalization for a magnetic targeted curcumin delivery system". New J. Chem, 40, pp. 4480-4491. (Year: 2016).*
Machine translation of CN 107050452 A, 13 pages. (Year: 2017).*
Ali, et al. ; Synthesis, characterization, and relaxometry studies of hydrophilic and hydrophobic superparamagnetic Fe3O4 nanoparticles for oil reservoir applications ; Colloids and Surfaces A 543; pp. 133-143 ; Feb. 1, 2018 ; 12 Pages.
Maity, et al. ; One-Pot Synthesis of Hydrophilic and Hydrophobic Ferrofluid ; International Journal of Nanoscience, vol. 8, Issue 01n02 ; 2009 ; Abstract Only ; 1 Page.
Ge, et al. ; Hydrophilic Superparamagnetic Nanoparticles: Synthesis, Characterization, and Performance in Forward Osmosis Processes ; I&EC Research Industrial & Engineering Chemistry Research ; pp. 382-388 ; Nov. 22, 2010 ; Abstract Only ; 2 Pages.
Qi, et al. ; Superparamagnetic Fe O nanoparticles: synthesis by a solvothermal process and functionalization for a magnetic targeted curcumin delivery system ; New Journal of Chemistry, issue 5 ; Feb. 4, 2016 ; Abstract Only ; 5 Pages.
Santrat, et al. ; Gadolinium-Encapsulating Iron Oxide Nanoprobe as Activatable NMR/MRI Contrast Agent; ACS Nano 6 (8) ; pp. 7281-7294 ; Jul. 18, 2012 ; Abstract Only ; 2 Pages.

* cited by examiner

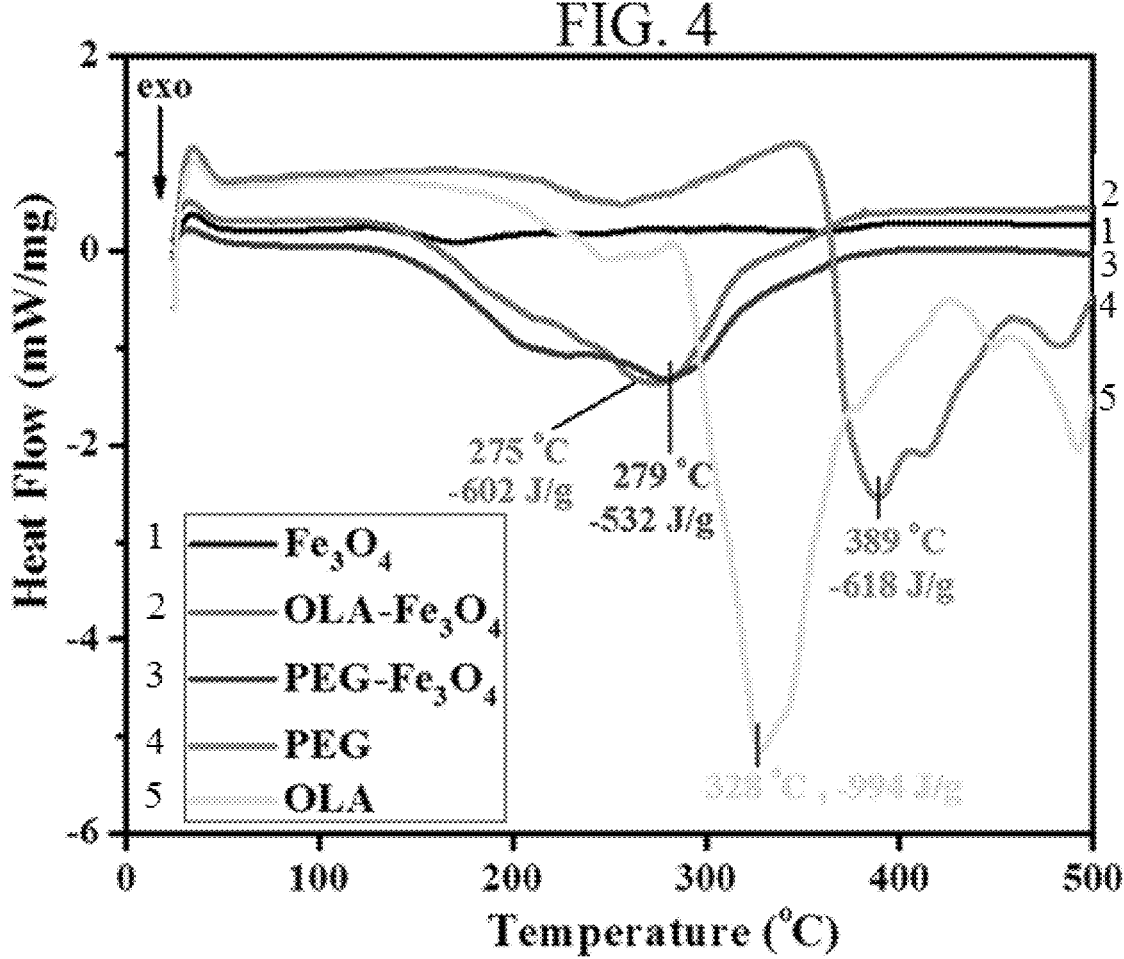

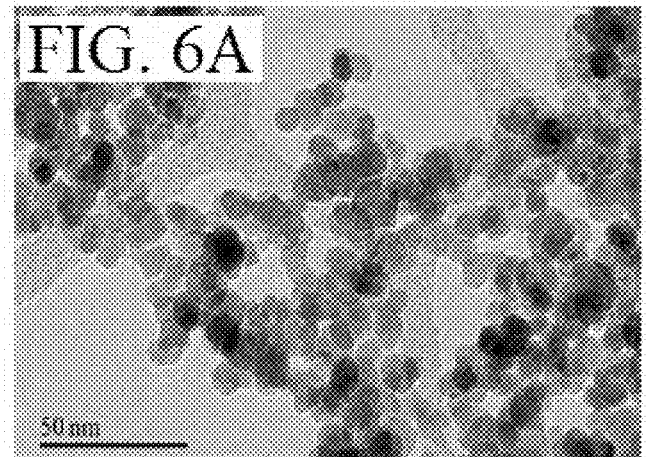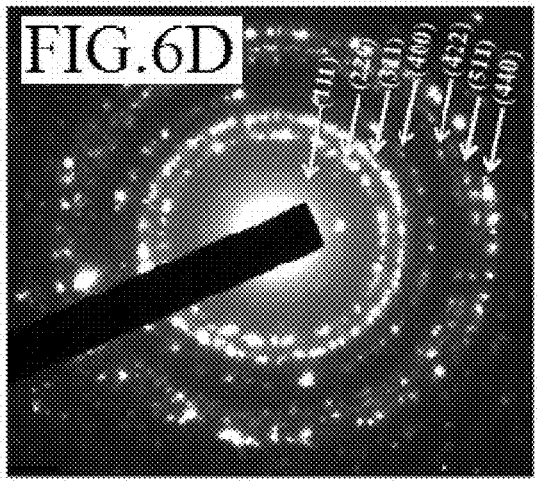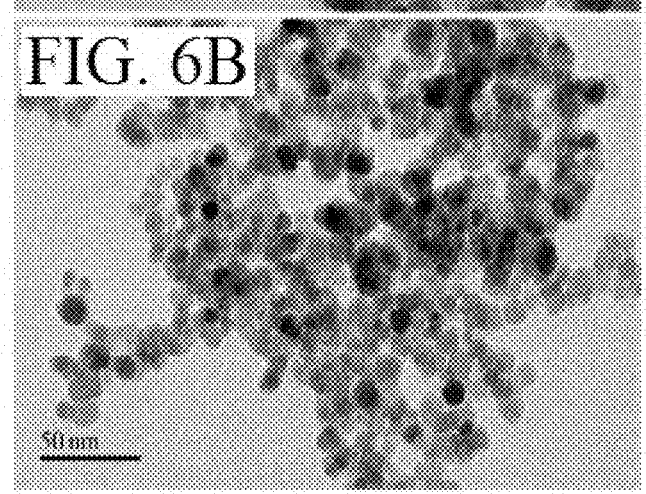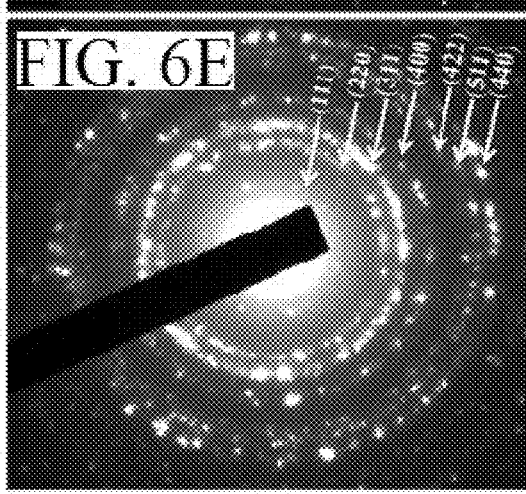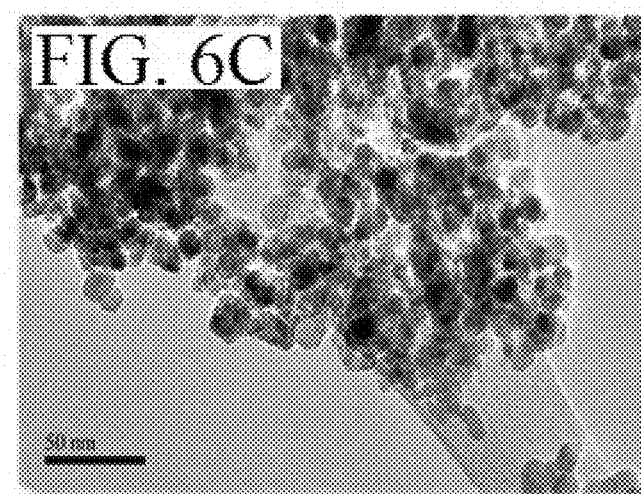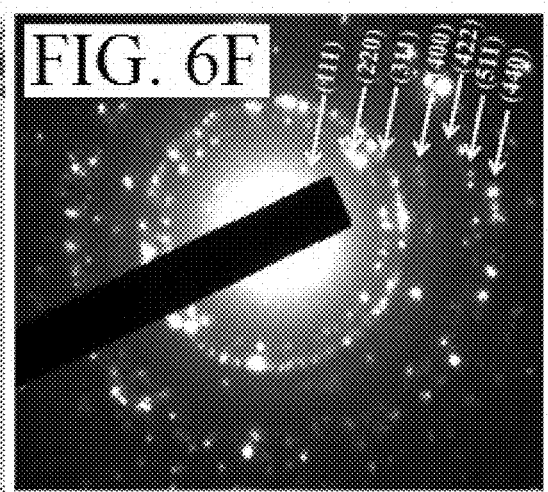

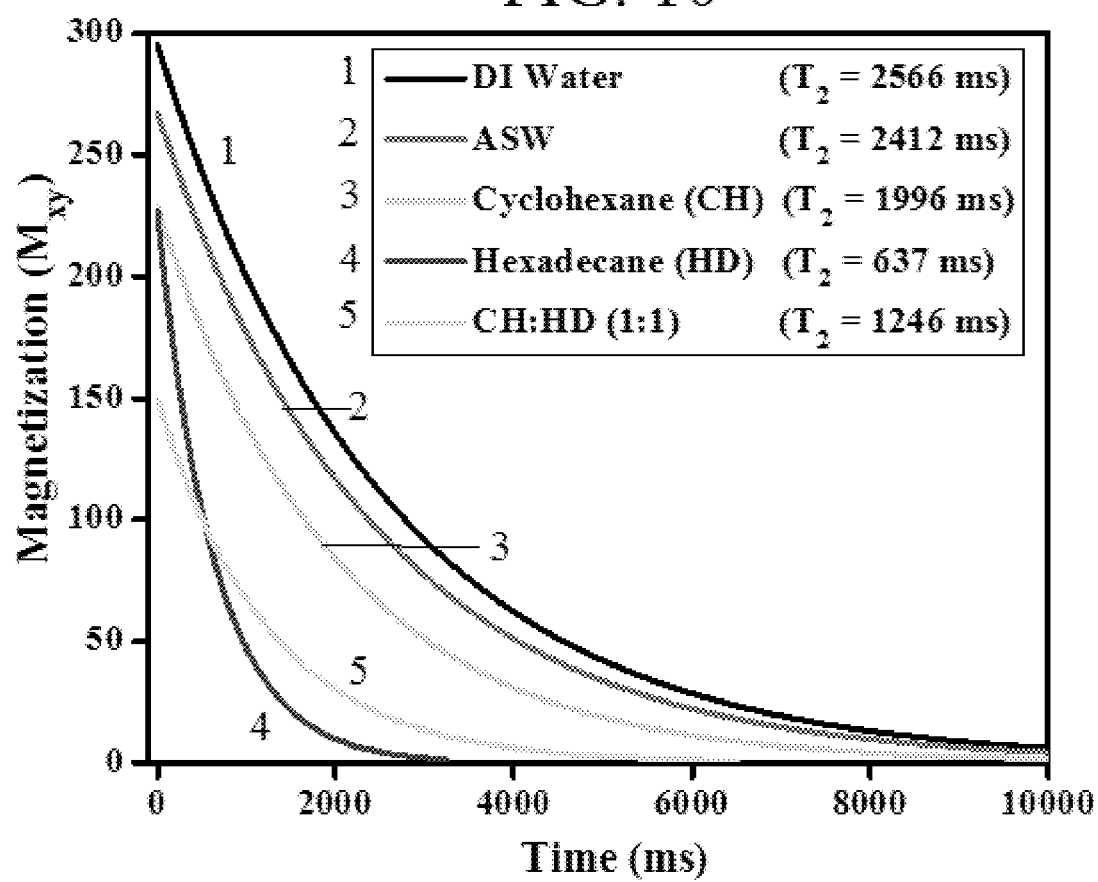

HYDROPHILIC AND HYDROPHOBIC SUPERPARAMAGNETIC FE₃O₄ NANOPARTICLES AS T₂-CONTRAST AGENTS FOR OIL RESERVOIR APPLICATIONS

STATEMENT REGARDING PRIOR DISCLOSURES BY THE INVENTORS

Aspects of this technology are described by Ali, et al., *Synthesis, characterization, and relaxometry studies of hydrophilic and hydrophobic superparamagnetic Fe₃O₄ nanoparticles for oil reservoir applications*; Colloids and Surfaces A: Physicochemical and Engineering Aspects, Volume 543, 20 Apr. 2018, Pages 133-143.

STATEMENT OF ACKNOWLEDGEMENT

The support provided by the Deanship of Graduate Studies at King Fand University of Petroleum & Minerals (KFUPM), Dhahran, Saudi Arabia, is gratefully acknowledged.

BACKGROUND

Field of the Invention

The invention falls within the fields of petroleum sciences and technology, material sciences, and nanochemistry.

Description of Related Art

The "background" description provided herein is for the purpose of generally providing a context of the disclosure. Work of the presently named inventors, to the extent it is described in this background section as well as aspects of the description which may not otherwise qualify as prior art at the time of filing are neither expressly or impliedly admitted as prior art against the present invention.

One of the most challenging, globally significant, and scientifically demanding areas in the oil exploration industry is the acquisition of information about and analysis of oil reservoirs; R. B. Bratvold, J. E. Bickel and H. P. Lohne, *SPE Reservoir Eval. Eng.*, 2009, 12, 630-638. Over the last decade, NMR spectroscopy has been used in the petroleum industry as a complementary tool to conventional methods of characterizing oil formations during the exploration stage. NMR can be used to examine the various types of fluids present in the pores of reservoir rocks; G. R. Coates, L. Xiao and M. G. Prammer, *NMR logging: principles and applications*, Gulf Professional Publishing, 1999. By tuning an NMR probe to a resonant frequency specific regions of reservoir rocks can be imaged. This NMR-based approach relies on a fundamental NMR technique known as spin-spin relaxation or $T_2$-relaxation in which the transverse component of the magnetization vector exponentially decays towards its equilibrium position.

There are various factors which can influence the $T_2$-relaxation time. For instance, the viscosity of a fluid is inversely proportional to $T_2$. Viscosity is an important parameter during oil exploration and interrogation of the in-situ molecular dynamics of petroleum fluids.

The concentrations and sizes of superparamagnetic nanoparticles (NPs, SPIONs) also play significant roles as they can alter $T_2$-relaxation and provide negative enhancement (i.e., a darker image) in $T_2$-weighted magnetic resonance imaging (MRI); J.-P. Korb, N. Vorapalawut, B. Nicot and R. G. Bryant, *J. Phys. Chem. C*, 2015, 119, 24439-24446.

Superparamagnetic iron oxide nanoparticles (SPIONs) have shown their potential applications in the fields of magnetic storage—see T. Fried, G. Shemer and G. Markovich, *Adv. Mater. (Weinheim, Ger.)*, 2001, 13, 1158-1161 and F. Liu, P. Cao, H. Zhang, J. Tian, C. Xiao, C. Shen, J. Li and H. Gao, *Adv. Mater. (Weinheim, Ger.)*, 2005, 17, 1893-1897; in catalysis—see X. J. Wu, R. Jiang, B. Wu, X. M. Su, X. P. Xu and S. J. Ji, *Adv. Synth. Catal.*, 2009, 351, 3150 3156 and M. B. Gawande, P. S. Branco and R. S. Varma, *Chem. Soc. Rev.*, 2013, 42, 3371-3393; in electrocatalysis—see S. Mitra, P. Poizot, A. Finke and J. M. Tarascon, *Adv. Funct. Mater.*, 2006, 16, 2281-2287 and A. Odagawa, Y. Katoh, Y. Kanzawa, Z. Wei, T. Mikawa, S. Muraoka and T. Takagi, *Appl. Phys. Lett.*, 2007, 91, 133503; biomedicine including for targeted drug delivery—see J. H. Maeng, D.-H. Lee, K. H. Jung, Y.-H. Bae, I.-S. Park, S. Jeong, Y.-S. Jeon, C.-K. Shim, W. Kim and J. Kim, *Biomaterials*, 2010, 31, 4995-5006 and J. Kim, J. E. Lee, S. H. Lee, J. H. Yu, J. H. Lee, T. G. Park and T. Hyeon, *Adv. Mater. (Weinheim, Ger.)*, 2008, 20, 478-483; hyperthermia treatments—see D. Shi, H. S. Cho, Y. Chen, H. Xu, H. Gu, J. Lian, W. Wang, G. Liu, C. Huth and L. Wang, *Adv. Mater. (Weinheim, Ger)*, 2009, 21, 2170-2173 and Q. L. Jiang, S. W. Zheng, R. Y. Hong, S. M. Deng, L. Guo, R. L. Hu, B. Gao, M. Huang, L. F. Cheng, G. H. Liu and Y. Q. Wang, *Appl. Surf. Sci.*, 2014, 307, 224-233; and in magnetic resonance imaging or MRI as T2-contrast agents—see F. Hu, K. W. MacRenaris, E. A. Waters, E. A. Schultz-Sikma, A. L. Eckermann and T. J. Meade, *Chem. Commun. (Cambridge, U. K.)*, 2010, 46, 73-75 and L. Wang, K.-G. Neoh, E.-T. Kang, B. Shuter and S.-C. Wang, *Biomaterials*, 2010, 31, 3502-3511. Recently, SPIONs have also been investigated as T2-contrast agents for reservoir applications; B. Zhang and H. Daigle, *J. Petroleum Sci. and Engin.* 162:180-189 (2018). The word "contrast" means the signal differences between adjacent regions, e.g. tissue/bone or tissue/vessel for medical applications and oil/water in terms of petroleum or liquid reservoir applications. Typical contrast agents for computed tomography and X-rays display contrast enhancements due to electron-density differences. On the other hand, contrast agents for Mill show contrasting effects based on their interactions with neighboring protons; H. B. Na, I. C. Song and T. Hyeon, *Adv. Mater. (Weinheim, Ger.)*, 2009, 21, 2133-2148. MRI is based on NMR in which relaxation of proton spins occurs in the presence of applied magnetic field. Therefore, contrast agents should have the capability to shorten the relaxation time of the neighboring protons; H. B. Na, et al, 2009, id.

It is reported that $T_1$-based agents provide positive contrast enhancements (e.g., a brighter image) in $T_1$-weighted MRI, whereas, $T_2$-based agents deliver negative contrast enhancements (e.g., a darker image) in $T_2$-weighted MRI; H. B. Na, et al, 2009, id. and Y. W. Jun, J. H. Lee and J. Cheon, *Angew. Chem. Int. Ed.*, 2008, 47, 5122-5135. $T_1$ is the time at which the magnetization reaches 63% of its final value, and three times $T_1$ is the time at which 95% polarization is achieved. Full polarization of typical reservoir-pore fluids may take several seconds. Large values of $T_1$ (measured in milliseconds) correspond to weak coupling between the fluid and its surrounding environment and a slow approach to magnetic equilibrium, whereas, small $T_1$ values represent strong coupling and a rapid approach to equilibrium. Different fluids, such as water, oil, and gas, have very different $T_1$ values. $T_1$ is directly related to pore size and viscosity. The free-induction decay (FID) signal measured in the x-y plane is called $T_2$—the transverse or spin-spin relaxation. In contrast to $T_1$, $T_2$ of hydrocarbons is much shorter in an inhomogeneous magnetic field. The process of spins losing their coherence due to magnetic field inhomogeneity is not a true "relaxation" process and is dependent on the location of the molecule in the magnet field distribution. Therefore, the FID decay constant is often referred as $T_2^*$ rather than $T_2$.

The primary objectives in NMR logging are measuring $T_1$ signal amplitude (as a function of polarization), $T_2$ signal amplitude and decay, and their distributions. The total signal amplitude is proportional to the total hydrogen content and is calibrated to give formation porosity independent of lithology effects. Both relaxation times can be interpreted for pore-size information and pore-fluid properties, especially viscosity. Depending on the activation used, the computation of a $T_1$ spectrum requires at least 50% or more, the time needed for the computation of a $T_2$ spectrum. In NMR logging, $T_1$ measurement initially required either a stationary mode or very slow logging speeds. With the latest multi-frequency tools, a technique used for speeding up $T_1$ measurements is to make simultaneous measurements of the individual steps observed during a $T_1$ recovery experiment in adjacent volumes; at least two such volumes are required. This technique enables $T_1$ acquisition in less time, thereby permitting faster logging speeds; see https://_petrowiki.org/Nuclear_magnetic_resonance_(NMR)_logging (last accessed Aug. 20, 2018, incorporated by reference).

SPIONs are promising candidates to give $T_2$ contrast properties (darker image) in $T_2$-weighted MRI. The inventors measured $T_2$ relaxation signals and $r_2$ relaxometry properties. The functional parameters of size, shape uniformity, colloidal stability and superparamagnetic characteristics distinguish the SPIONs of the invention from other magnetic particles. For example, the SPIONs synthesized by the inventors have better stability and efficiency than the commercial contrast agents as shown herein.

The efficiency of contrast agents is usually expressed in terms of longitudinal ($r_1$) and/or transversal ($r_2$) relaxivity. The higher values of $r_1$ and $r_2$ are related to the $T_1$-positive and $T_2$-negative contrast enhancements, respectively; Z. Li, P. W. Yi, Q. Sun, H. Lei, H. Li Zhao, Z. H. Zhu, S. C. Smith, M. B. Lan and G. Q. M. Lu, *Adv. Funct. Mater.*, 2012, 22, 2387-2393.

Among various forms of iron oxides, magnetite ($Fe_3O_4$) NPs exhibit a variety of potential applications owing to a high Curie temperature ($T_C^{bulk}$ ~850 K at $T_K \approx 125$ K) and highest saturation magnetization of ($M_S^{bulk}$ ~92 emu/g) among the oxides of iron; V. N. Nikiforov, Y. A. Koksharov, S. N. Polyakov, A. P. Malakho, A. V. Volkov, M. A. Moskvina, G. B. Khomutov and V. Y. Irkhin, *J. Alloys Compd.*, 2013, 569, 58-61. Moreover, the magnetic behavior of magnetite NPs is related to their size and it is well-established that magnetite NPs show transition from multi-domain to single-domain magnetic structures as the size decreases below 90 nm.

Upon further reduction in the size to below 30 nm, these NPs can reveal superparamagnetic behavior at room temperature; K. M. Krishnan, *IEEE Trans. Magn.*, 2010, 46, 2523-2558. If the size of NPs≥30 nm, then coercive forces may dominate and can cause aggregation in the presence of strong external magnetic field; Y. V. Kolen'ko, M. Bañobre-López, C. Rodríguez-Abreu, E. Carbó-Argibay, A. Sailsman, Y. Piñeiro-Redondo, M. F. Cerqueira, D. Y. Petrovykh, K. Kovnir and O. I. Lebedev, *J. Phys. Chem. C*, 2014, 118, 8691-8701. However, the synthesis of stable and dispersible SPIONs having ultra-small size is very challenging and hence distinct research efforts are required to prepare SPIONs of desirable properties for NRM and MRI applications.

Various synthetic methods, e.g., coprecipitation (G. Wang, X. Zhang, A. Skallberg, Y. Liu, Z. Hu, X. Mei and K. Uvdal, *Nanoscale*, 2014, 6, 2953-2963), solvothermal (V. Patsula, L. Kosinová, M. Lovrié, L. Ferhatovic Hamzié, M. Rabyk, R. Konefal, A. Paruzel, M. Šlouf, V. Herynek and S. k. Gajović, *ACS Appl. Mater. Interfaces*, 2016, 8, 7238-7247 and X. Liang, G. Ji, L. Zhang, Y. Yang and X. Liu, *Glass Phys. Chem.*, 2011, 37, 459-465), hydrothermal (Y. V. Kolen'ko, et al., 2014, id and X.-D. Liu, H. Chen, S.-S. Liu, L.-Q. Ye and Y.-P. Li, *Mater. Res. Bull.*, 2015, 62, 217-221., polyol (M. Abbas, B. Parvatheeswara Rao, S. M. Naga, M. Takahashi and C. Kim, *Ceram. Int.*, 2013, 39, 7605-7611 and M. Abbas, B. P. Rao, M. N. Islam, S. Naga, M. Takahashi and C. Kim, *Ceram. Int.*, 2014, 40, 1379-1385), thermal decomposition (Z. Xu, C. Shen, Y. Hou, H. Gao and S. Sun, *Chem. Mater.*, 2009, 21, 1778-1780) and thermolysis (J. Cha, P. Cui and J.-K. Lee, *J. Mater. Chem.*, 2010, 20, 5533-5537) have been adopted for the synthesis of hydrophilic and hydrophobic SPIONs.

Magnetite NPs coated with a silica shell ($Fe_3O_4@SiO_2$) have been prepared via a modified Stober process using $Fe_3O_4$ seeds (C. Hui, C. Shen, J. Tian, L. Bao, H. Ding, C. Li, Y. Tian, X. Shi and H.-J. Gao, *Nanoscale*, 2011, 3, 701-705). It was observed that the silica shell thickness could be controlled by tuning various experimental parameters such as the concentration of seeds, the ratio of tetraethyl orthosilicate (TEOS)/$Fe_3O_4$ and reaction termination time. The synthesized NPs exhibited superparamagnetic behavior at room temperature. Similarly, $Fe_3O_4@SiO_2$ NPs having hydrophilic characteristics were synthesized by thermolysis using poly (vinyl pyrrolidone) (PVP), and TEOS in the presence of $NH_4OH$ catalyst; J. Cha, et al., 2010, id. However, these synthetic processes involved tedious surface treatments and multi-step procedures including hydrolysis and condensation reaction of TEOS.

Abbas et al., 2013, id. reported a single-step polyol method for the synthesis of hydrophilic SPIONs using polyethylene glycol (PEG) as a solvent and a stabilizing agent. The pH of the solution was adjusted to ~10 by the addition of NaOH and reaction was carried out at a relatively higher temperature (300° C.). Abbas, et al. 2014, id. reported a modified polyol method for the encapsulation of a silica shell on the surface of magnetite NPs to induce hydrophilicity under similar reaction conditions. U.S. Pat. Nos. 8,828,357, 8,383,085 and U.S. Patent Publication U.S. 2017/0266670 also describe multistep methods for making hydrophobic FeO or $Fe_3O_4$ nanoparticles.

Using another approach, Xu and his co-workers reported a single-step thermal decomposition method for synthesis of monodisperse hydrophobic SPIONs in which the size of NPs was tuned by varying the volumetric ratio between oleylamine (OLA) and benzyl ether; Z. Xu, et al., 2009, id. However, the thermal decomposition of iron acetyl acetonate $Fe(acac)_3$ was carried out in the presence of highly flammable benzyl ether at a high temperature (300° C.) making it quite hazardous.

In view of the limitations of conventional methods, the inventors sought to provide a safer, more convenient way to produce SPIONS having superior properties as contrast agents and which had the hydrophilic or hydrophobic characteristics and stability necessary for interrogating petroleum and other fluid reservoirs.

BRIEF SUMMARY OF THE INVENTION

As disclosed herein, the inventors now provide a single-step, facile solvothermal method for the synthesis of SPIONs having the hydrophilic or hydrophobic characteristics, size, and stability necessary for interrogating geological formations and petroleum and other fluid reservoirs. In these methods solvents such as polyethylene glycol or oleylamine act as reducing, stabilizing and capping agents and the inventors show that PEG-400 (Mn 380-420 g/mol) and OLA, respectively, can be selectively employed to provide hydrophilic and hydrophobic functionalities on the surface of SPIONs. The SPIONs produced by a method according to the invention were characterized by several physicochemical techniques and compared to uncoated-$Fe_3O_4$ NPs which were prepared by a coprecipitation method using $NH_4OH$ as precipitating agent. The stability of functionalized SPIONs made according to the invention was monitored in representative environments, such as artificial sea water (ASW) or model oil (cyclohexane-hexadecane 1:1) and the quenching of $T_2$-relaxation signals produced using various concentrations of SPIONs was determined. Both hydrophilic- and hydrophobic-functionalized SPIONs were found to exhibit excellent relaxivity properties compatible with the use as $T_2$-contrast agents for oil reservoir applications.

Embodiments of this technology include but are not limited to those disclosed below.

One aspect of the invention is directed to a method for making SPIONS that includes (i) for hydrophilic-$Fe_3O_4$ SPIONS: mixing an iron-containing precursor with a hydrophilic ligand or capping agent to form a homogeneous suspension; heating the homogenous suspension to a temperature sufficient to bind the hydrophilic ligand to the iron-containing precursor, cooling the resulting homogenous suspension, adding a solvent to the cooled homogeneous suspension to precipitate hydrophilic-$Fe_3O_4$ SPIONs into a slurry, separating the precipitated hydrophilic-$Fe_3O_4$ SPIONs from the slurry, and washing the hydrophilic-$Fe_3O_4$ SPIONs to remove unbound hydrophilic ligands or capping agent, thereby making hydrophilic hydrophilic-$Fe_3O_4$ SPIONS; or (ii) for hydrophobic-$Fe_3O_4$ SPIONS: mixing an iron-containing precursor with a hydrophobic ligand or capping agent to form a homogeneous suspension; heating the homogenous suspension to a temperature sufficient to bind the hydrophobic ligand or capping agent with the iron-containing precursor, cooling the homogenous suspension, adding a solvent to precipitate hydrophobic-$Fe_3O_4$ SPIONS into a slurry, separating hydrophobic-$Fe_3O_4$ SPIONS from the slurry, and washing the hydrophobic-$Fe_3O_4$ SPIONS to remove unbound hydrophobic ligand or capping agent, thereby making hydrophobic-$Fe_3O_4$ SPIONS. In some embodiments, iron(III) ethylhexanoate can be substituted from iron(III) acetylacetonate; polyethylene glycol-based surfactants may be used instead of PEG; and oleic acid may be replaced with oleylamine.

Variables for the solvothermal process include: (i) nature of solvent, (ii) nature of precursors and (iii) synthesis temperature. These factors may affect the particle size and shape homogeneity, which consequently results in changes to $T_1$ and $T_2$ values. The inventors observed that these variables as they select for smaller particle size and better shape homogeneity gave better relaxometry properties and vice versa.

In some embodiments, this method will be a single-step solvothermal method wherein the hydrophilic and hydrophobic ligands or capping agents participate in reducing, stabilizing and capping of the SPIONs produced which can then be recovered, washed and further processed, for example, dried.

In some embodiments, the heating is performed in an autoclave or other closed controlled environment at a pressure ranging from 5, 10, 20, 30, 40, 50, 60, 70, 80, 90, 100 or >100 psi.

When this method is used to produce hydrophilic-$Fe_3O_4$ SPIONs, the iron-containing precursor may be selected to be iron(III) acetylacetonate, the hydrophilic ligand or capping agent selected to be polyethylene glycol (PEG), and the heating selected to be at a temperature that is less than the standard boiling point for said hydrophilic ligand or capping agent; the solvent may be selected to be at least one alcohol, ketone, ether or other organic solvent. The hydrophilic-SPIONs may be washed in at least one alcohol, ketone, ether or other organic solvent.

When this method is used to produce hydrophobic-$Fe_3O_4$ SPIONs, the iron-containing precursor may be selected to be iron(III) acetylacetonate, the hydrophilic ligand or capping agent selected to be oleylamine (OLA) or another unsaturated fatty amine, and the heating selected to be at a temperature that is less than the standard boiling point for said hydrophobic ligand or capping agent; the solvent may be selected to be at least one alcohol, ketone, ether or other organic solvent. The hydrophobic-SPIONs may be washed in at least one alcohol, ketone, ether or other organic solvent.

In further embodiments of the invention, the hydrophilic-$Fe_3O_4$ SPIONs are made from an iron-containing precursor that is iron(III) acetylacetonate, the hydrophilic ligand or capping agent is polyethylene glycol 400 (PEG-400; Mn 380-420 g/mol), the heating is at a pressure of 15 to 45 psi and at a temperature ranging from 160, 165, 170, 175, 180, 190, 195-200° C., preferably from 175 to 185° C. for at least 12, 18, 24, 30, to 36 hours, the cooling the mixture is to <15, 20, 25, 30, 35 or >35° C. (or any intermediate temperature), the hydrophilic-SPIONs are washed in a mixture of absolute ethanol and diethylether.

In other further embodiments of this method where hydrophobic-$Fe_3O_4$ SPIONs are made, the iron-containing precursor is selected to be iron(III) acetylacetonate, the hydrophobic ligand or capping agent is oleylamine (OLA), the heating is at a pressure of 40 to 80 psi and at temperature ranging from 260, 265, 270, 275, 280, 285, 290 to 300° C., preferably from 275 to 285° C. for at least 12, 18, 24, 30, to 36 hours, the cooling the mixture is to <15, 20, 25, 30, 35 or >35° C. (or any intermediate temperature), the hydrophobic-SPIONs are washed in a mixture of absolute ethanol and diethylether.

Advantageously, a solvothermal method may be performed in a sealed autoclave that is safer and more controlled than performing thermal decomposition of organic precursors in open atmosphere at high temperature. In the synthesis of both PEG-SPIONs and OLA-SPIONs highly stable organic solvents such as PEG-400 and oleylamine are used which, respectively have boiling points of ~240° C., and ~364° C.

In some embodiments, during the synthesis of PEG-coated $Fe_3O_4$ NPs (SPIONS) by a single step solvothermal method, the autoclave pressure may range from 20, 25, 30, 35 or 40 psi and autoclave temperature range from 160, 170, 180, 190 or 200° C.; preferably, the approximate value of pressure inside the autoclave will be ~30 psi at 180° C. These ranges include all intermediate subranges and values.

In other embodiments, during a single-step solvothermal synthesis of oleylamine coated $Fe_3O_4$ NPs in an autoclave, the approximate pressure value inside the autoclave will be about 50, 55, 60, 65 or 70 psi, preferably about 60 psi, at a temperature ranging from 260, 270, 280, 290 or 300° C., preferably at a temperature of about 280° C. These ranges include all intermediate subranges and values.

Typically, the solvothermal methods disclosed herein where temperature and pressure are controlled will safely synthesize and yield highly-dispersed, monocrystalline, size- and shape-controlled s SPIONs in an environment.

Another embodiment of the invention involves superparamagnetic nanoparticles ("SPIONs") that include (i) a core that contains magnetite and hydrophilic functional groups bonded to a surface of the core, wherein the hydrophilic functional groups include polyethylene glycol moieties; wherein the hydrophilic superparamagnetic nanoparticles have a spheroidal or spherical morphology with a TEM diameter of about 8, 9, 10, 11, 12, 13, 14, 15, or 16 nm and a transversal relaxivity ($r_2$) for PEG-$Fe_3O_4$ of about 61, 62, 63, 64, 65, 66, 66.7, 67, 68, 69, 70, 71, or 72, $mM^{-1}s^{-1}$, advantageously about 66.7, and exhibit thermal stability in inert conditions with substantially no phase transformation between 200, 250, 300, 350, 400, 450, or 500° C.; or that include (ii) a core that contains magnetite; and hydrophobic functional groups bonded to a surface of the core, wherein the hydrophobic functional groups include oleylamine moieties, wherein the hydrophobic superparamagnetic nanoparticles have a spheroidal or spherical morphology with a diameter of about 10, 11, 12, 13, 14, 15, 16, 17, or 18 nm and have a transversal relaxivity ($r_2$) for OLA-$Fe_3O_4$ of about 45, 46, 47, 48, 49, 50, 51, 52, 53, or $mM^{-1}s^{-1}$, advantageously about 49.0, and which exhibit thermal stability with substantially no phase transformation between 200, 250, 300, 350, 400, 450, or 500° C.

The hydrophilic SPIONs of the invention, such as PEG-SPIONs, may exhibit a phase composition of magnetite, a crystallite size ranging from about 10, 10.5, 11, 11.5, 12, 12.5, 13, 13.3, 13.5, 14, 14.5, 15, 15.5 to about 16, preferably about 13 nm; and/or a unit cell volume ranging from 560, 565, 570, 580, 588, 590, or 600 $Å^3$ preferably about 588 $Å^3$. In preferred embodiments, the hydrophilic SPION will not contain reactive surface groups such as carboxylic acid or amine groups.

The hydrophobic SPIONs of the invention, such as OLA-SPIONs, may exhibit a phase composition of magnetite, a crystallite size ranging from about 11, 11.5, 12, 12.5, 13, 13.5, 14, 14.1, 14.5, 15, 15.5, 16, 16.5 to 17, preferably about 14 nm; and/or a unit cell volume ranging from 560, 565, 570, 575, 580, 585, 589, 590, 595, or 600 $Å^3$ preferably about 589 $Å^3$. In preferred embodiments, the hydrophobic SPION will not contain reactive surface groups such as carboxylic acid or amine groups.

In some embodiments, the surface of the magnetite core of the SPIONS is bonded to polyethylene glycol moieties or other hydrophilic groups, in other embodiments the surface is bonded to OLA moieties or other hydrophobic groups. In one embodiment, the surface of the magnetite core is bonded to PEG moieties; in other embodiment, the surface of the magnetite core is bonded to OLA moieties. The SPIONS disclosed herein may be made by a solvothermal method described below.

Transversal relaxivity of PEG-SPIONs and OLA-SPIONs was determined in artificial sweater (ASW) and model oil (cyclohexane:hexadecane, 1:1), respectively, at ambient temperature and pressure.

PEG-SPIONs of the invention are equally efficient and more stable as compared to SHU-555C ($r_2$=69 $mM^{-1}$ $s^{-1}$).

PEG-SPIONs and OLA-SPIONs of the invention are more stable, efficient and less expensive as compared to Gd-DTPA ($r_2$=5.3 $mM^{-1}$ $s^{-1}$).

In another embodiment, the invention is directed to drilling mud or drilling fluid that includes the hydrophilic or hydrophobic SPIONs disclosed herein such as PEG-SPION or OLA-SPIONs. As described herein there are three main categories of drilling fluids which are water-based muds, which can be dispersed and non-dispersed, non-aqueous muds, often called oil-based muds, and gaseous drilling fluids, in which air or a wide range of other gases can be used. Drilling fluids include water, seawater, brines as well as compositions containing additional or other ingredients such as air or other gases, surfactants, bentonite and other clays as well various kinds of muds. Other components of drilling fluid are described by https://_en.wikipedia.org/wiki/Drilling_fluid (last accessed Aug. 15, 2018, incorporated by reference). The hydrophilic SPIONs of the invention may advantageously be incorporated into drilling muds or reservoirs containing aqueous ingredients or materials; the hydrophobic SPIONs of the invention may advantageously incorporated into hydrophobic drilling muds or reservoirs containing oil or other hydrophobic materials. PEG-SPIONs (hydrophilic) are suitable for water-based drilling fluids (WDF) prepared with barite, ilmenite, and/or manganese tetroxide. While OLA-SPIONs (hydrophobic) are suitable for oil-based drilling fluids (ODF) having weighting agents such as barite, ilmenite, and manganese tetroxide.

Another embodiment of the invention is a geological formation or fluid reservoir containing or doped with the hydrophilic or hydrophobic SPIONs disclosed herein. The geological formation may contain porous rocks having a variety of pore sizes, impermeable rock, water, brine, oil or gas or mixtures of these which may be contained in porous rocks or next to between layers of impermeable rock. The geological formation may be under dry land or underwater, such as beneath a lake, sea or ocean. SPIONs may be incorporated into a geological formation by one or more injectors, through one or more boreholes, or during drilling, for example, in combination with water, brine, injection surfactant mixtures, or drilling fluids or drilling muds.

In another embodiment, the invention is directed to a nuclear magnetic resonance (NMR) or magnetic resonance imaging (MRI) procedure involving contacting a material such as rock or a geological formation, or a body, tissue or vessels, with a contrast agent comprising the SPIONs disclosed herein. Methods for biomedical or clinical use of MRI contrast agents are known in the art and incorporated by reference to https://_en.wikipedia.org/wiki/MRI_contrast_agent (last accessed Aug. 16, 2018) as are methods for using contrast agents or magnetic tags in petroleum exploration or logging.

Another embodiment of the invention is directed to a method for NMR logging of a geological formation that includes injecting or otherwise incorporating the hydrophilic and/or hydrophobic SPIONs into the geological formation for example through a borehole or during the drilling of a borehole, generating a magnetic field and detecting a magnetic signal. This method may be performed with SPIONs that are hydrophilic such as PEG-SPIONs or with SPIONs that are hydrophobic such as OLA-SPIONs. In some embodiments both hydrophilic and hydrophobic SPIONs may be used, for example, by targeting portions of the geological formation containing water with hydrophilic SPIONs and those with oil or other non-aqueous components with hydrophobic SPIONs. Some embodiments of this method involve logging-while-drilling (LWD) logging and/or wireline logging. SPIONs may be introduced into a geological formation through a bore hole or concurrently with drilling. SPIONs may be injected into oil and/or water or brine present in a fluid reservoir in the geological formation or into or around porous or non-porous rock. In some embodiments, these methods will detect or measure a magnetic signal is a T1 signal and/or a T2 signal. PEG- and OLA SPIONs can be useful to enhance $T_1$ contrast properties.

In another embodiment the SPIONs of the invention are employed in a method for tracking, tracing, or quantifying oil and/or water in a geological formation or fluid reservoir by injecting them into the geological formation or fluid reservoir and detecting a concentration of SPIONs in oil and/or water recovered from the geological formation or fluid reservoir. In some embodiments, the same or different kinds of SPIONs may be introduced into a geological formation through different bore holes; see C. Huh, N. Nizamidin, G. a. Pope, T. E. Milner, and B. Wang, "Hydrophobic paramagnetic nanoparticles as intelligent crude oil tracers," pp. 1-10, 2014. WO 2014123672 A1, incorporated by reference.

BRIEF DESCRIPTION OF THE DRAWINGS

FIG. 4. Comparative DSC curves of $Fe_3O_4$, OLA-$Fe_3O_4$, PEG-$Fe_3O_4$ SPIONs along with oleylamine (OLA) and polyethylene glycol (PEG). This figure shows the thermal behavior of uncoated and coated SPIONs in the temperature range of 20-500° C.

FIGS. 6A-6F. High-resolution TEM images (FIGS. 6A-6C) and SAED patterns (FIGS. 6D-6F) of PEG-$Fe_3O_4$, OLA-$Fe_3O_4$, and $Fe_3O_4$ SPIONs, respectively.

In FIGS. 7A-7C, the graphs from top to bottom follow the order in the boxed legend with 0.012 mM sample being shown by the top graph and 0.48 mM sample by the lowest.

FIG. 10. $T_2$-relaxation curves and relaxation time measurement of DI water, artificial sea water (ASW), cyclohexane, hexadecane, and model oil.

DETAILED DESCRIPTION OF THE INVENTION

Figure 1A:
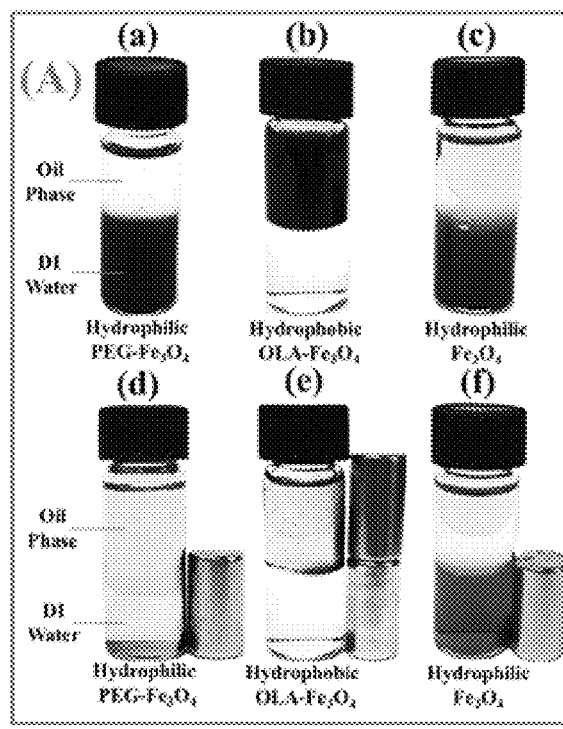
FIG. 1A. Functionality and stability test of PEG-$Fe_3O_4$, OLA-$Fe_3O_4$, and $Fe_3O_4$ SPIONs in oil-DI water (oil-deionized water). Stability of PEG-$Fe_3O_4$ (samples a, d), OLA-$Fe_3O_4$ (samples b, e), and $Fe_3O_4$ (samples c, f) in the oil-DI water phase.

The inventors disclose herein a safe and simple single-step solvothermal method for the synthesis of highly-stable hydrophilic and hydrophobic superparamagnetic iron oxide nanoparticles (SPIONs) as $T_2$-contrast agents. These SPIONs have contrast properties and stabilities that permit their employment in petroleum exploration and monitoring, such as in interrogation of oil reservoirs.

The invention provides $T_2$ contrast agents with several superior properties including (i) quenching of $T_2$-relaxation signals with select SPIONs concentrations, (ii) excellent relaxivity properties due to ultra-small SPION size, and (iii) long-term stability including thermal stability in different media. These properties permit use of the SPIONs of the invention in harsh conditions often found in petroleum reservoirs.

A petroleum reservoir or oil and gas reservoir is a sub-surface pool of hydrocarbons contained in porous or fractured rock formations and may be broadly classified as a conventional or unconventional reservoir. In a conventional reservoir, the naturally occurring hydrocarbons, such as crude oil or natural gas, are trapped by overlying rock formations with lower permeability. While in an unconventional reservoir the rocks have high porosity and low permeability which keeps the hydrocarbons trapped in place.

The SPIONs made by a method according to the invention may be used as contrast agents for magnetic (e.g., NMR) characterization or interrogation of a conventional or unconventional petroleum, gas or other liquid reservoir (or as contrast agents in magnetic imaging such as MRI).

In some embodiments, the SPION-based methods for characterization or interrogation of a petroleum reservoir may be used in conjunction with a seismic survey, appraisal well, and computer modelling of a reservoir. These combined techniques may be used to assess the size, volume or uniformity of a reservoir, compartmentalization of a reservoir, the location of oil-water contact in a reservoir, height of oil-bearing sands, rock porosity, percentage of rock containing fluids or percentage of solid rock, estimate the amount of petroleum or gas or other fluid in a reservoir and recovery factor (proportion of recoverable oil or gas). Data obtained by use of the SPIONs of the invention and conventional techniques may be used to help build a computer model of a reservoir.

A SPION is a superparamagnetic iron oxide nanoparticle. As demonstrated herein the surface of a SPION may be functionalized to make it more hydrophilic or hydrophobic, enhance its stability under particular conditions, such as in the presence of water, sea water, mixtures of water or sea water and oil, or in oil or other petroleum materials, or affect its ability to be magnetically detected or imaged (e.g., by NMR or MRI). It may be functionalized to reduce its ability to non-specifically bind to a substrate and to improve its ability to associate with a particular target substrate.

A SPION may be made of magnetite $Fe_3O_4$ and/or its oxidized form maghemite or $\gamma$-$Fe_2O_3$. In some embodiments, a SPION of the invention will contain $Fe_2O_3$ or a mixture such as $NiFe_2O_4$, $CuFe_2O_4$, $MnFe_2O_4$ or $CoFe_2O_4$. In some embodiments a SPION, exclusive of functionalization, will consist of $Fe_2O_3$ and exclude other metallic components such as those described above or metals such as gadolinium. In many embodiments, the SPIONs of the invention will exhibit substantial thermal stability with no phase transformation between 200, 250, 300, 350, 400, 450 and 500° C.

In NMR, T1 relaxation is the process by which the net magnetization (M) grows/returns to its initial maximum value (Mo) parallel to $B_o$. Synonyms for T1relaxation include longitudinal relaxation, thermal relaxation and spin-lattice relaxation.

T2 relaxation is the process by which the transverse components of magnetization (Mxy) decay or dephase. In medical MRI (NMR-based imaging), T1 images are used to highlight fat tissue, while $T_2$ images highlight fat and water.

The relaxation rates ($r_2$ or 1/T2) for PEG-SPIONs of the invention may range between 60, 61, 62, 63, 64, 65, 66, 66.7, 67, 68, 69, 70, 71, 72-73 $mM^{-1}$ $s^{-1}$, preferably about 66.7; and for OLA-SPIONS from about 44, 45, 46, 47, 48, 49.0, 50, 51, 52, 53-54 $mM^{-1}s^{-1}$, preferably about 49.0.

SPIONs are usually $T_2$-based contrast agents and $T_2$ contrast is one aspect of the invention. Hydrophilic-SPIONs help to alter $T_2$ signal produced from water, while hydrophobic SPIONs change $T_2$ signal produce from oil. $T_2$ signals coming from brine saturated with hydrophilic SPIONs are different than $T_2$ signals of brine alone. Similarly, $T_2$ signals received from oil having with hydrophobic SPIONs is different than $T_2$ signals of oil alone. $T_1$-based contrast agents provide positive contrast enhancement (i.e., brighter image) which also help to distinguish the water and oil phases in the porous rock. $T_1$-based contrast agents provide positive contrast enhancement (i.e., brighter image) which also help to distinguish the water and oil phases in the porous rock.

Moreover, there is no significant advantage to use the combination of hydrophilic and hydrophobic SPIONs. $T_2$ signals coming from brine saturated with hydrophilic SPIONs is different than $T_2$ signal of brine alone. Similarly, $T_2$ signal receive from oil having with hydrophobic SPIONs is different than $T_2$ signal of oil alone.

Advantageously, PEG-SPIONs (hydrophilic) can exhibit colloidal stability in water as well as in seawater. However, OLA-SPIONs (hydrophobic) can provide the colloidal stability in model oil.

The average diameter of a SPIONs as disclosed herein may range from nm, 2 to 30 nm such as 2, 3, 4, 5, 6, 7, 8, 9, 10, 11, 12, 13, 14, 15, 16, 17, 18, 19, 20,21, 22, 23, 24, 25, 26, 27, 28, 29 to 30 nm, and advantageously from 9, 10, 11, 12, 13, 14, or 15 nm. When the size of a SPION is greater than 30 nm, coercive forces may dominate and can cause aggregation in the presence of strong external magnetic field.

The preferred average diameter of particles is ≤20 nm in order to achieve better relaxometry properties.

Polyethylene glycols useful in a method according to the invention may be selected from liquid PEGs, such as those having number average molecular weights (Mn g/mol) of 200, 300, 400, 500, or 600 g/mole as well as all intermediate values within this range. PEGs may act as reducing and/or stabilizing agents that confer hydrophilic properties on a SPION. Advantageously, PEG having an average molecular weight of about 400 is used in a method according to the invention.

The preferred average molecular range for PEG can be 300-500 g/mol because PEG moieties having MW<300 lack sufficient hydrophilicity while PEG moieties having MW>500 g/mol. impair permeability or stability.

An unsaturated fatty amine may be used in a method according to the invention as a mild reducing and stabilizing agent or to produce a more hydrophobic SPION. Advantageously, oleylamine is used. An unsaturated fatty amine such as oleylamine can function as a solvent for a reaction mixture, as coordinating agent to stabilize the surface of nanoparticles, or as a coordinator with metal ions, and thus affect the kinetics of nanoparticle formation during their synthesis.

As alternatives to oleylamine, oleic acid and other unsaturated amines such as oleylamine acetate, oleylamine hydrofluoride may be utilized to synthesized SPIONs having hydrophobic characteristics. NMR is often applied to the human body in clinical applications. The same physical principles involved in clinical imaging also apply to imaging any fluid-saturated porous media, including reservoir rocks. Nuclear magnetic resonance (NMR) may be used as a tool to interrogate a geological formation that may contain a liquid reservoir, such as a gas, oil or water reservoir. Typically an external magnetic field is imposed in the formation to make a measurement that is proportional to the porosity, regardless of lithology. This allows identification of the free- and bound-fluid volumes and the free-fluid type (gas, oil or water) and indication of permeability. In some embodiments of the invention the SPIONs disclosed herein are used as contrast agents for NMR or MRI; see http://_www.halliburton.com/public/lp/contents/Books_and_Catalogs/web/NMR-Logging-Principles-and-Applications.pdf (last accessed Aug. 20, 2018, incorporated by reference).

In some embodiments of the invention, hydrophilic and/or hydrophobic SPIONS are injected during drilling of a borehole and permit NMR interrogation along the length of the borehole. In contrast to MRI where a subject is placed at the center of an MRI instrument, geological logging places the instrument itself in a wellbore at a location within the geological formation to be analyzed by magnetic resonance imaging logging or MRIL. In some embodiments, hydrophilic SPIONs are incorporated into a water-based mud and hydrophobic SPIONs into an oil-based mud during logging.

Generally, SPIONs are injected into the borehole as oil-based or water-based colloidal dispersion itself. However, these SPIONs can be a part of drilling fluid and enhanced oil recovery (EOR) package. Commercially available NMR probes may be used to measure $T_1$ and $T_2$ relaxation signals.

In other embodiments, the hydrophilic and/or hydrophobic SPIONs of the invention may be contacted or incorporated into a rock sample obtained from a geological formation which is then interrogated by NMR in a laboratory to assess porosity, permeability, water saturation, fluid displacement, hydrocarbon typing, etc.

Generally, cylindrical rock cores are selected for NMR measurements. Briefly, the cores are saturated with a brine solution followed by saturation with crude oil or vice versa. The brine-oil saturated cores are completely scanned with NMR spectrometer. Then cores are cleaned by adopting a standard cleaning procedure using toluene. Similarly, the cores are saturated with a brine solution having hydrophilic SPIONs followed by saturation with crude oil. The saturated cores having contrast agents are scanned again with NMR spectrometer. Nuclear magnetic resonance (NMR) logging is a type of well logging that uses the NMR response of a formation to directly determine its porosity and permeability. It provides a continuous record along the length of a borehole. NMR logging measures the induced magnet moment of hydrogen nuclei (protons) contained within the fluid-filled pore space of porous media (reservoir rocks). Unlike conventional logging measurements (e.g., acoustic, density, neutron, and resistivity), which respond to both the rock matrix and fluid properties and are strongly dependent on mineralogy, NMR-logging measurements respond to the presence of protons (e.g., in hydrogen). Because these protons primarily occur in pore fluids, NMR effectively responds to the volume, composition, viscosity, and distribution of these fluids, for example, oil, gas or water.

An important mechanism affecting NMR relaxation is grain-surface relaxation. Molecules in fluids are in constant Brownian motion, diffusing about the pore space and bouncing off the grain surfaces. Upon interaction with the grain surface, hydrogen protons can transfer some nuclear spin energy to the grain contributing to T1 relaxation or irreversibly dephase contributing to T2 relaxation. Therefore, the speed of relaxation most significantly depends on how often the hydrogen nuclei collide with the grain surface and this is controlled by the surface-to-volume ratio of the pore in which the nuclei are located. Collisions are less frequent in larger pores, resulting in a slower decay of the NMR signal amplitude and allowing a petrophysicist to understand the distribution of pore sizes.

NMR logs provide information about the quantities of fluids present, the properties of these fluids, and the sizes of the pores containing these fluids. From this information, it is possible to infer or estimate the volume (porosity) and distribution (permeability) of the rock pore space, rock composition, type and quantity of fluid hydrocarbons, and hydrocarbon producibility. NMR logging provides measurements of a variety of critical rock and fluid properties in varying reservoir conditions (e.g., salinity, lithology, and texture), some of which are unavailable using conventional logging methods and without requiring radioactive sources. Whether run independently as a standalone service or integrated with conventional log and core data for advanced formation and fluid analyses, NMR logging has significantly contributed to the accuracy of hydrocarbon-reservoir evaluation. Wireline-logging devices are commercially available as are logging-while-drilling (LWD) devices and downhole NMR spectrometers; see https://_petrowiki.org/Nuclear_magnetic_resonance_(NMR)_logging (last accessed Aug. 13, 2018, incorporated by reference).

NMR logging is typically performed using wireline tool or logging-while-drilling (LWD) tools. In the conventional wireline-logging technology, NMR logging is performed as the logging tool is being lowered into a drilled borehole. In the emerging LWD technology, the logging tools are generally rigged up as a part of the drilling string and follow a drill bit during actual well drilling. Each tool type has its own advantages. The wireline-tools enable high logging speeds and high-quality measurements. The LWD tools, on the other hand, provide real-time data during drilling operations that may be used to prevent loss of circulation, blowouts, stuck pipes, hole instability and other disastrous consequences of borehole drilling.

The SPIONs disclosed herein may be suspended in water or sea water or other aqueous, non-aqueous, or emulsion compositions, such as drilling muds and used as contrast agents.

Drilling muds are classified based on their fluid phase, alkalinity, dispersion and chemical components. They may be dispersed systems such as freshwater muds that have a low pH (7.0-9.5) and may include spud, bentonite, natural or artificial polymers, phosphate treated muds, organic mud and organic colloid treated mud. Other freshwater muds include high pH muds such as alkaline tannate-treated muds having a pH of 9.5 or more. Water based drilling muds can repress hydration and dispersion of clay and include high pH lime muds, low pH gypsum, seawater and saturated salt water muds. Water-based drilling mud most commonly contains or consists of bentonite clay (gel) with additives such as barium sulfate (barite), calcium carbonate (chalk) or hematite. Various thickeners are used to influence the viscosity of the fluid, e.g. xanthan gum, guar gum, glycol, carboxymethylcellulose, polyanionic cellulose (PAC), or starch. Deflocculants can be used to reduce viscosity of clay-based muds; anionic polyelectrolytes (e.g. acrylates, polyphosphates, lignosulfonates (Lig) or tannic acid derivates such as Quebracho) are frequently used.

Non-dispersed system muds include low solids mud and emulsions. Low solids muds contain less than 3-6% solids by volume and weight less than 9.5 lbs/gal. Most muds of this type are water-based with varying quantities of bentonite and a polymer. Two types of emulsion muds are oil in water (oil emulsion muds) and water in oil (invert oil emulsion muds). Oil based muds contain oil as the continuous phase and water as a contaminant, and not an element in the design of the mud. They typically contain less than 5% (by volume) water. Oil-based muds are usually a mixture of diesel fuel and asphalt, however can be based on produced crude oil and mud.

EXAMPLES

The following examples illustrate various aspects of the present invention. They are not to be construed to limit the claims in any manner whatsoever.

As described in more detail below, the surfaces of SPIONs were functionalized by bonding polyethylene glycol (PEG-400) or oleylamine (OLA) on their surfaces to respectively provide hydrophilic and hydrophobic properties to incorporate into aqueous (e.g., water, seawater, brine) or oil (e.g., crude oil) materials in a geological reservoir. Uncoated SPIONs were also prepared by coprecipitation method using $NH_4OH$ as a reducing agent for comparison. Stability of hydrophilic SPIONs was monitored in deionized (DI) water and/or artificial seawater (ASW), while stability of hydrophobic SPIONs was investigated in model oil (cyclohexane-hexadecane 1:1).

X-ray diffraction (XRD) and X-ray photoelectron spectroscopy (XPS) profiles confirmed the magnetite ($Fe_3O_4$) phase of synthesized nanoparticles (NPs). The presence of C—O (532.4 eV) and —$NH_2$ (399.7 eV) in XPS spectra of N1s and O1s substantiated the surface functionalization of $Fe_3O_4$ NPs with PEG and OLA, respectively. Transmission electron microscopy (TEM) images demonstrated the spherical shape NPs having particle diameters 11.6±1.4, 12.7±2.2 and 9.1±3.0 for PEG-$Fe_3O_4$, OLA-$Fe_3O_4$, and $Fe_3O_4$, respectively. NMR $T_2$-relaxation measurements were performed by an acorn area analyzer and demonstrated meaningful results for NP (SPION) use in targeted reservoir applications, for example, the transversal relaxivity ($r_2$) values for PEG-$Fe_3O_4$ (66.7 $mM^{-1}$ $s^{-1}$) and OLA-$Fe_3O_4$ (49.0 $mM^{-1}$ $s^{-1}$) were surprisingly found to be 2.07 and 1.53 times higher than those for $Fe_3O_4$ (32.2 $mM^{-1}$ $s^{-1}$) NPs, respectively.

Synthesis of Hydrophilic SPIONs.

The hydrophilic magnetite ($Fe_3O_4$) NPs (SPIONs) were prepared by a solvothermal method using PEG-400 (Aldrich). Briefly, 6 mmol (2.185 g) of iron(III) acetylacetonate Fe(acac)$_3$ (97%, Fluka) and 75 g of PEG-400 were mixed with the help of a Silverson mixer (L5M-A, USA) in an 125 mL polytetrafluoroethylene (PTFE) vessel for 1 hr to obtain a homogenous red suspension at room temperature. The PTFE vessel was placed in a stainless steel autoclave reactor (Parr, USA) and kept in a synthetic oven (280A, Fisher Scientific) at 180° C. for 24 h. Then, the mixture was cooled down to room temperature and the black slurry of $Fe_3O_4$ was precipitated by the addition of absolute ethanol (>99%, Fisher Scientific) with an excess amount of diethyl ether (>99%, Sigma-Aldrich). The NPs were centrifuged at 10,000 rpm for 10 min using 3-30KS centrifuge (Sigma, Germany). To remove unbound PEG-400, the NPs were redispersed in absolute ethanol and centrifuged again at 20,000 rpm for 30 min. The purification procedure was repeated three-times. The final black product was labeled as PEG-$Fe_3O_4$ and divided into two equal parts. Then, half of the product was dispersed in Milli-Q water while remaining half was dried in vacuum oven at 50° C. for 24 h.

Synthesis of Hydrophobic SPIONs.

The hydrophobic $Fe_3O_4$ NPs were synthesized by a solvothermal method using OLA (70%, Aldrich). Briefly, 5 mmol (1.820 g) of Fe(acac)$_3$ precursor and 25 mL of OLA were mixed with the help of a Silverson mixer in 125 mL PTFE vessel for 1 h to obtain a homogenous red suspension. The PTFE vessel was placed in a stainless steel autoclave reactor and kept at 280° C. for 24 h. Then, the mixture was cooled down to room temperature. The precipitation and purification procedure of the synthesized NPs remained same as described above for the synthesis of hydrophilic $Fe_3O_4$. The final black product was labeled as OLA-$Fe_3O_4$ and divided into two equal parts. Then, half of the product was dispersed in cyclohexane-hexadecane (1:1) mixture, while the remaining half was dried in vacuum oven at 50° C. for 24 h.

Synthesis of Uncoated SPIONs.

The uncoated-$Fe_3O_4$ NPs were prepared by coprecipitation of Fe(III) and Fe(II) in the molar ratio (2:1) using $NH_4OH$ solution as a reducing agent. The complete reaction was carried out under an Ar atmosphere and the stirring was carried out by using overhead Teflon stirrer (IKA Eurostar, Germany). In a typical procedure, 100 mL of Milli-Q water was acidified with 1.0 mL of concentrated HCl (37%, Sigma-Aldrich) and purged with Ar gas for 15 min. Then, 1.2 M $FeCl_3.6H_2O$ (>99%, Sigma-Aldrich) and 0.6 M $FeCl_2.4H_2O$ (>99%, Sigma-Aldrich) aqueous solutions were prepared in acidified water. The solutions were filtered-off with 0.2-micron hydrophobic PTFE membrane filter (Millex-FG, Millipore). Then, Fe(II) solution was mixed dropwise with Fe(III) solution in a three-neck round bottom flask. The reaction mixture was heated up to 80° C. and 20 mL of $NH_4OH$ (28-30%, Sigma-Aldrich) solution was poured into the iron precursors at 500 rpm. The color of dispersion changed from golden brown to black indicating the formation of $Fe_3O_4$ NPs. The dispersion was continuously stirred, refluxed and heated for 1 hr followed by the addition of 5 mL tetramethylammonium hydroxide (25%, Sigma-Aldrich) solution to stabilize the NPs. Then, the reaction mixture was allowed to cool down to room temperature. The magnetic NPs were washed several times with absolute ethanol as described above. The final product was labeled as $Fe_3O_4$ and divided into two equal parts. Half of the product was dispersed in milli-Q water while remaining half was vacuum dried in the oven at 50° C. for 24 h.

Functionality and Colloidal Stability Test.

The hydrophilic functionality and colloidal stability of as-synthesized SPIONs (i.e., PEG-$Fe_3O_4$ and $Fe_3O_4$) were tested in deionized (DI, pH 7.0) water as well as artificial seawater (ASW, pH ~8.0). ASW was prepared which meets American standard for testing and materials (ASTM). Briefly, ASW according to the ASTM D1141-98 standard was prepared by dissolving 36.03 g·L$^{-1}$ of a salt mixture in DI water. The composition of salt mixture was as follows; NaCl (99.5%, 24.53 g), $MgCl_2$ (98%, 5.20 g), $Na_2SO_4$ (99%, 4.09 g), $CaCl_2$ (99.9%, 1.16 g), KCl (99%, 0.695 g), $NaHCO_3$ (99.7%, 0.201 g), KBr (99%, 0.101 g), $H_3BO_3$ (99.5%, 0.027 g), $SrCl_2$ (99.9%, 0.025 g) and NaF (99%, 0.003 g). The estimated density and salinity of ASW were 1.020 g·mL$^{-1}$ and 36.0 gL$^{-1}$ respectively. However, the hydrophobic functionality and colloidal stability of as-synthesized OLA-$Fe_3O_4$ NPs was monitored in standard model oil composed of the mixture of cyclohexane and hexadecane (1:1). For each test, as-synthesized SPIONs were dispersed in a bottle containing both, the model oil and ASW (1:1). Then, the functionality of NPs was investigated in terms of their hydrophilic or hydrophobic characteristics, while the stability of NPs was monitored in their respective media.

Material Characterization.

The diffraction patterns of various SPIONs were recorded using a Smart Lab X-ray diffractometer (Rigaku, Japan) with a diffraction angle (2θ) range of 15-80° at a scan rate of 2°/min. Surface analysis of the synthesized magnetic materials was performed using an X-ray photoelectron spectrometer (ESCALAB 250Xi, Thermo Scientific, UK). The thermal behavior of functionalized NPs was studied using differential scanning calorimeter (DSC 204 F1 Phoenix, NETZSCH, Germany). DSC measurements were performed in the temperature range 20-500° C. with a scan rate of 10° C./min under $N_2$ environment to avoid material oxidation. The surface morphology, size, and shape of the synthesized SPIONs were evaluated by using a field emission scanning electron microscope (FESEM-Tescan Lyra-3) as well as a transmission electron microscope (JEM-2100, JEOL, USA). TEM grids were coated by putting slurry of the analyte onto 200 mesh copper grids. The grids were examined after 1 hr of initial degassing under vacuum. An inductively coupled plasma atomic emission spectrometer (ICP-AES, Varian) was used to estimate the Fe content in as-synthesized SPIONs.

To determine the feasibility of contrast agents, $T_2$-relaxation curves for various concentrations of SPIONs were attained using an acorn area analyzer (Xigo Nanotools, UK), which is normally used for surface area measurements; R. Tantra, *Nanomaterial Characterization: An Introduction*, John Wiley & Sons, 2016. The suitability of this miniaturized technique to obtain meaningful results is demonstrated here first time by showing its potential for targeted reservoir applications. For all the measurements, values of tau ($\tau$) and the total number of scans were kept constant, i.e., $\tau$=0.5 ms, scans=4.

Functionality and Colloidal Stability of Synthesized SPIONs.

The functionality and colloidal stability of SPIONs are important factors related to their ultimate use in oil exploration industries for reservoir applications. FIG. 1A demonstrates functionality tests of (a) PEG-$Fe_3O_4$, (b) OLA-$Fe_3O_4$, and (c) $Fe_3O_4$ in an oil-DI water environment. The partitioning observed by naked eye showed that PEG-$Fe_3O_4$ and $Fe_3O_4$ NPs had hydrophilic characteristics due to the presence of PEG and OH surface functional groups, respectively. The presence of OH groups on the surface of $Fe_3O_4$ NPs may be due to the hydroxylation process during coprecipitation; H. R. Shaterian and M. Aghakhanizadeh, *Catal. Sci. Tech.*, 2013, 3, 425-428. Moreover, OLA-$Fe_3O_4$ NPs remained in the oil-phase owing to the presence of OLA functionality, which induces surface hydrophobicity.

The colloidal stability of as-synthesized SPIONs was monitored in mixed oil-DI water and oil-seawater phases. FIG. 1A shows the stability of (a, d) PEG-$Fe_3O_4$, (b, e) OLA-$Fe_3O_4$, and (c, f) $Fe_3O_4$ in the oil-DI water phase. It was observed that PEG-$Fe_3O_4$ and OLA-$Fe_3O_4$ NPs remained stable and attracted in an external magnetic field in their respective environments. However, the uncapped-$Fe_3O_4$ NPs became unstable and were not fully attracted after applying the magnetic field. This may be attributed to the pH-dependence of $Fe_3O_4$ NPs which may have surfaces that are easily oxidized to other forms of iron oxides/hydroxides in an aqueous media having pH≤7; Sayar, 2006, id.

Figure 1B:
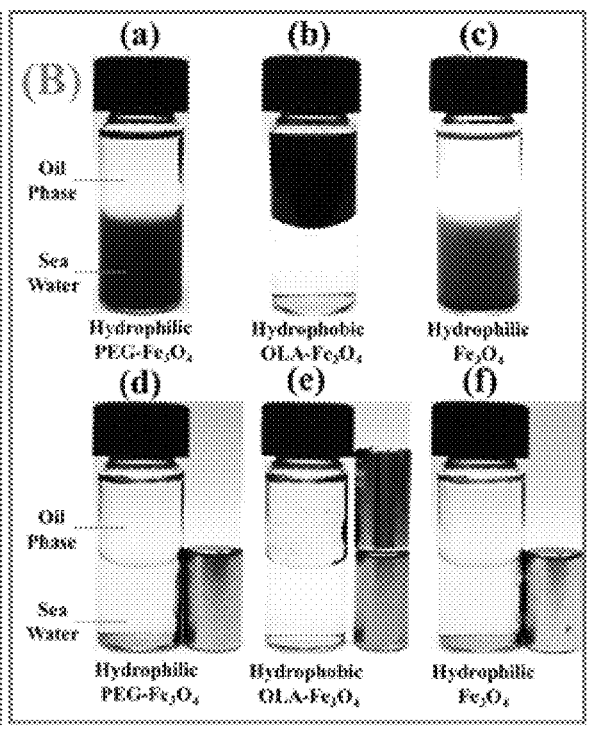
FIG. 1B. Functionality and stability test of PEG-$Fe_3O_4$, OLA-$Fe_3O_4$, and $Fe_3O_4$ SPIONs in oil-seawater phase. Stability of PEG-$Fe_3O_4$ (samples a, d), OLA-$Fe_3O_4$ (samples b, e), and $Fe_3O_4$ (samples c, f) in oil-seawater phases.

Similarly, FIG. 1B depicts the stability of (samples a, d) PEG-$Fe_3O_4$, samples b, e) OLA-$Fe_3O_4$, and (samples c, f) $Fe_3O_4$ in oil-seawater phases. Similar behavior was observed for PEG-$Fe_3O_4$ and OLA-$Fe_3O_4$ NPs. The uncapped-$Fe_3O_4$ NPs became stable and were attracted by an applied magnetic field in ASW which has a slightly basic pH of about 8.0.

Crystal Structure, Phase, and Chemical Composition Analysis.

Figure 2:
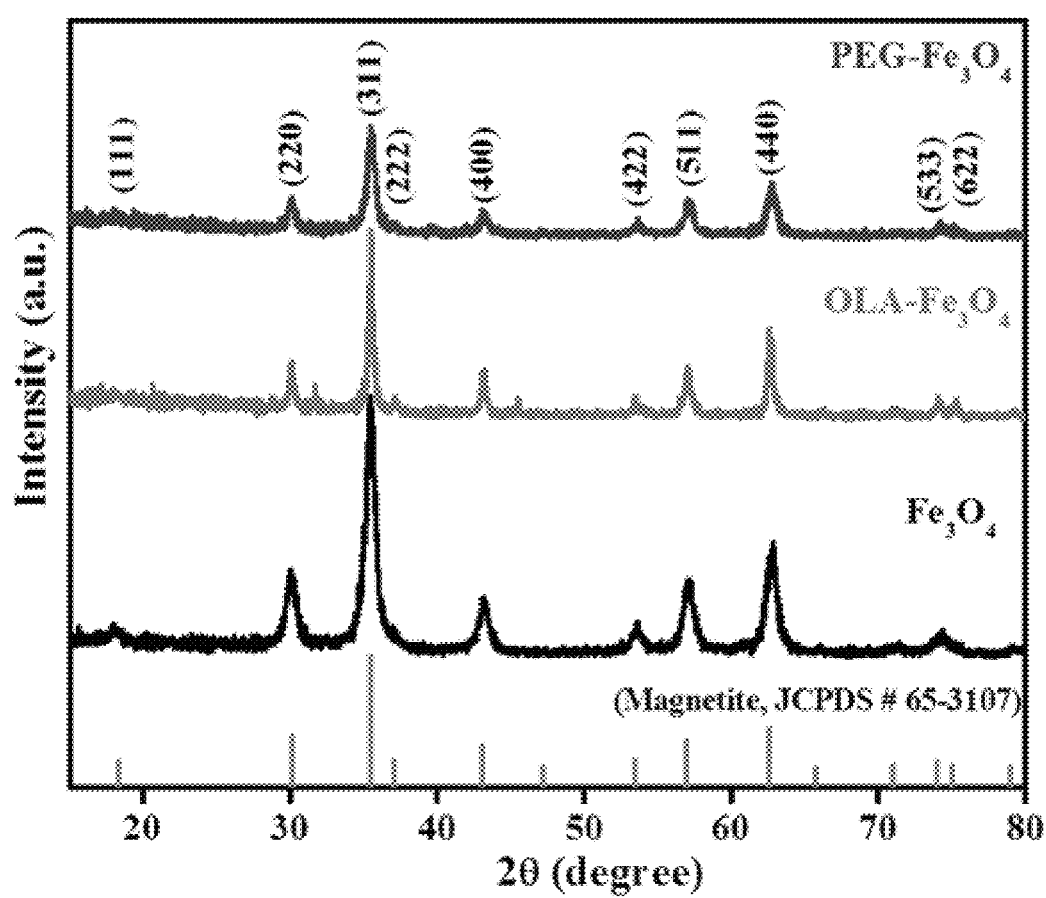
FIG. 2 shows diffractograms of three types of magnetic NPs synthesized using PEG, OLA, and $NH_4OH$ (top to bottom, respectively).

The phase, purity and crystal structures of as-synthesized SPIONs were examined via XRD analysis. FIG. 2 shows the diffractograms of three types of magnetic NPs synthesized using PEG, OLA, and $NH_4OH$. The observed diffraction profiles are consistent with the standard pattern (JCPDS card no. 65-3107) indicating the formation of pure magnetite phase. The six major diffraction peaks observed at $2\theta$ positions of 30.08°, 35.50°, 43.22°, 53.65°, 57.13° and 62.75° assigned to (2 2 0), (3 1 1), (4 0 0), (4 2 2), (5 1 1) and (4 4 0) crystalline planes, respectively; H. Sun, B. Chen, X. Jiao, Z. Jiang, Z. Qin and D. Chen, *J. Phys. Chem. C*, 2012, 116, 5476-5481 and P. L. Hariani, M. Faizal and D. Setiabudidaya, *IJESD*, 2013, 4, 336. According to structure analysis, the magnetite NPs exhibited the cubic inverse spinel structure with Fd-3m space group; R. M. Cornell and U. Schwertmann, *The iron oxides: structure, properties, reactions, occurrences and uses*, John Wiley & Sons, 2003. The comparison of XRD profiles revealed that peak intensities decreased after surface functionalization of magnetite NPs due to the amorphous nature of capping agents (PEG-400 and OLA), which may indicate the coating of SPIONs; A. M. Atta, H. A. A1-Lohedan and S. A. A1-Hussain, *Int. J Mol. Sci.*, 2015, 16, 6911-6931. The average crystallite sizes of magnetite NPs as evaluated using Debye-Scherrer equation (I. Khan, S. Ali, M. Mansha and A. Qurashi, *Ultrason. Sonochem.*, 2017, 36, 386-392) were found to be ~13.3, ~14.1 and ~9.6 nm for PEG-$Fe_3O_4$, OLA-$Fe_3O_4$, and $Fe_3O_4$, respectively. The cubic unit cell parameters (a) and cell volume (V) for as-synthesized NPs are reported in Table 1.

TABLE 1

Comparison of various parameters of as-synthesized SPIONs.

| SPIONs | Synthesis method | Reducing agent | Crystallite size (nm) | Unit cell parameter (Å) | Unit cell volume (Å$^3$) | Phase composition | TEM diameter (nm) |
|---|---|---|---|---|---|---|---|
| PEG-$Fe_3O_4$ | Solvothermal 180° C. 24 h | Polyethylene glycol-400 | 13.3 | 8.377 | 587.9 | Magnetite | 11.6 ± 1.4 |
| OLA-$Fe_3O_4$ | Solvothermal 280° C. 24 h | Oleylamine | 14.1 | 8.385 | 589.4 | Magnetite | 12.7 ± 2.2 |
| $Fe_3O_4$ | Coprecipitation 80° C. 1 h | Ammonium hydroxide | 9.6 | 8.299 | 571.7 | Magnetite | 9.1 ± 3.0 |

The comparison indicates that PEG-$Fe_3O_4$ and OLA-$Fe_3O_4$ have almost similar values of unit cell parameters, perhaps owing to the same synthetic protocol (solvothermal method). However, the uncapped-$Fe_3O_4$ NPs synthesized via the co-precipitation method possess lower unit cell parameters. This difference of values suggests that synthetic protocols play a pivotal role in controlling the crystal structure of NPs; Y. V. Kolen'ko, M. Bañobre-López, C. Rodríguez-Abreu, E. Carbó-Argibay, A. Sailsman, Y. Piñeiro-Redondo, M. F. Cerqueira, D. Y. Petrovykh, K. Kovnir and O. I. Lebedev, *J. Phys. Chem. C*, 2014, 118, 8691-8701. It is well-documented that magnetite ($Fe_3O_4$) and maghemite ($\gamma$-$Fe_2O_3$) exhibit almost similar XRD patterns; X. Zhang, Y. Niu, X. Meng, Y. Li and J. Zhao, *CrystEngComm*, 2013, 15, 8166-8172. Therefore, the phase analysis of as-synthesized SPIONs was further explored via XPS technique, which exclusively determines various phases of iron oxides, i.e., magnetite, maghemite, and hematite.

Figure 3A:
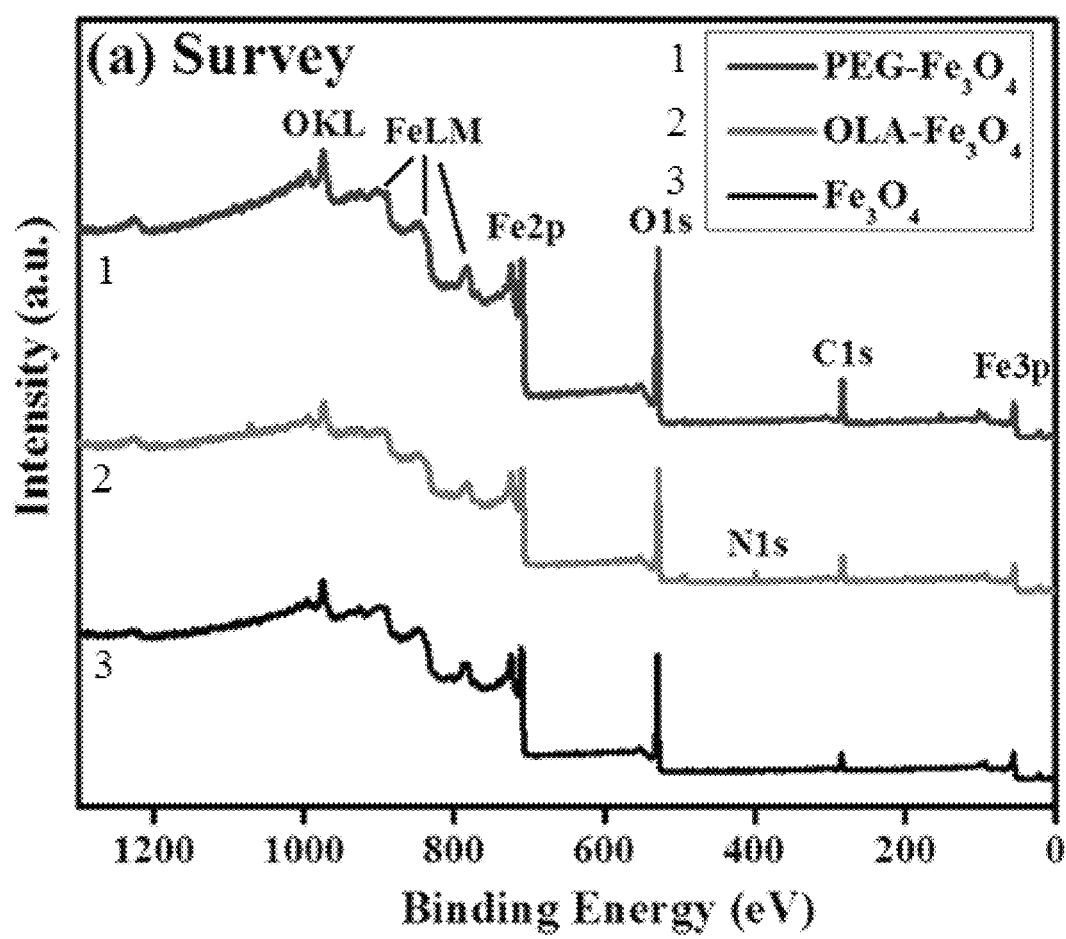
FIG. 3A surveys PEG-$Fe_3O_4$ (top), OLA-$Fe_3O_4$ (middle), and $Fe_3O_4$ (bottom) spectra showing Fe2p, N1s, O1s, and C1s features.
Figure 3B:
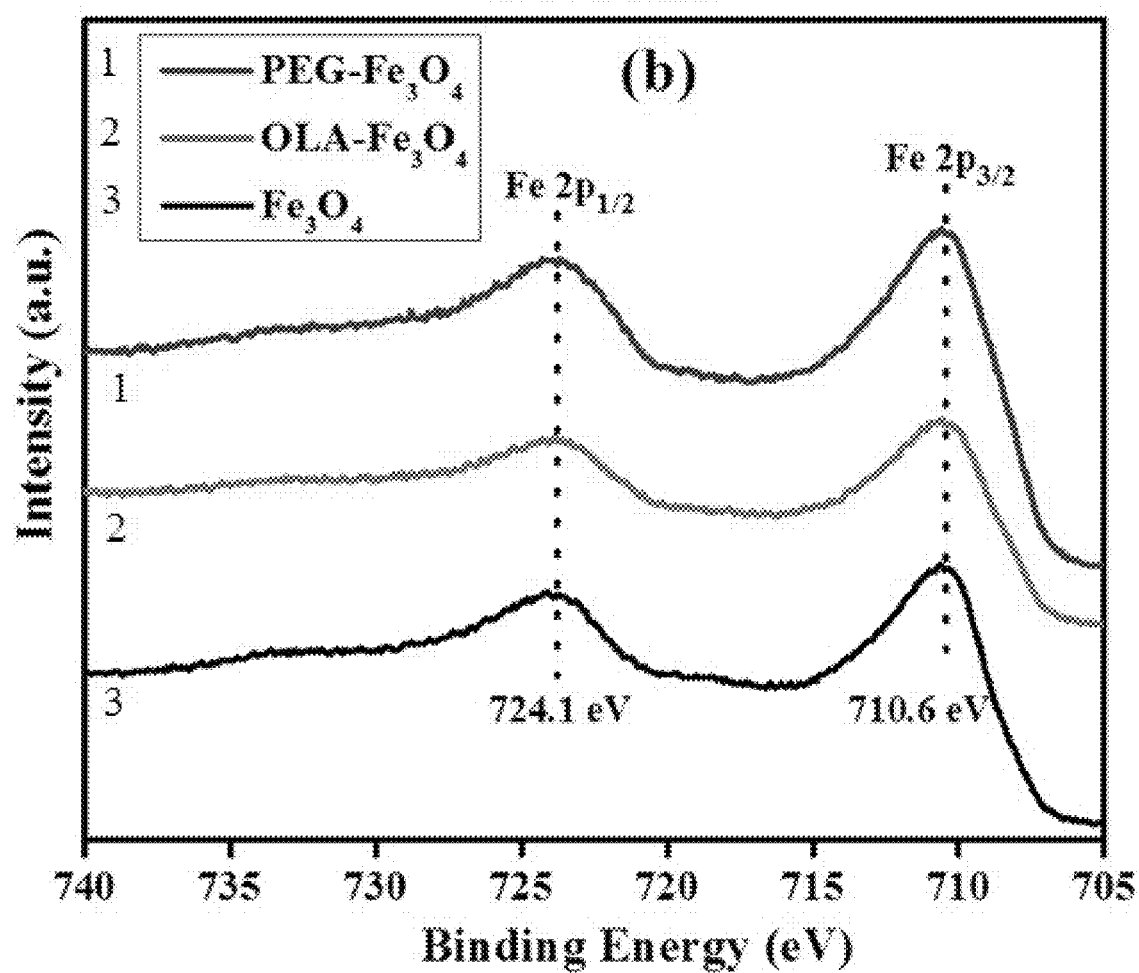
FIG. 3B. XPS profile of SPIONs, Fe2p. This figure compares XPS profiles of PEG-$Fe_3O_4$ (top), OLA-$Fe_3O_4$ (middle), and $Fe_3O_4$ (bottom) freshly synthesized powder samples.

A survey of PEG-$Fe_3O_4$, OLA-$Fe_3O_4$, and $Fe_3O_4$ spectra (FIG. 3A) shows the presence of Fe2p, N1s, O1s, and C1s features. The observed spectral lines are labeled according to their binding energies. For C1s, the adventitious/aliphatic carbon (C—C) peak detected at 284.8 eV was used as a reference. FIG. 3B shows XPS profiles of PEG-$Fe_3O_4$, OLA-$Fe_3O_4$, and $Fe_3O_4$ freshly synthesized powder samples. The observed spectra are almost similar to each other as well as with the standard $Fe_3O_4$ sample; T. Yamashita and P. Hayes, *Appl. Surf Sci.*, 2008, 254, 2441-2449. It is reported elsewhere that Fe $2p_{3/2}$ does not have a satellite peak for $Fe_3O_4$ phase; G.Wang, et al., 2014, id. Liu, et al., 2015, id. and T. Yamshita, et al., 2008, id. Similarly, the absence of satellite peak at 719.0 eV here further confirms the magnetite phase of as-synthesized iron oxide NPs. Moreover, the two distinct asymmetric peaks observed at binding-energy values of 710.6 and 724.1 eV (spin-orbit splitting, $\Delta$=13.5 eV) corresponded to $Fe2p_{3/2}$ and $Fe2p_{1/2}$ further confirm $Fe_3O_4$ phase (711.0 and 724.6 eV in the case of $\gamma$-$Fe_2O_3$ phase); T. Yamshita, et al., 2008, id.

Surface Functionalization.

The presence of hydrophilic and hydrophobic coating on the surface of SPIONs was investigated using two complementary techniques: XPS and DSC.

Figure 3C:
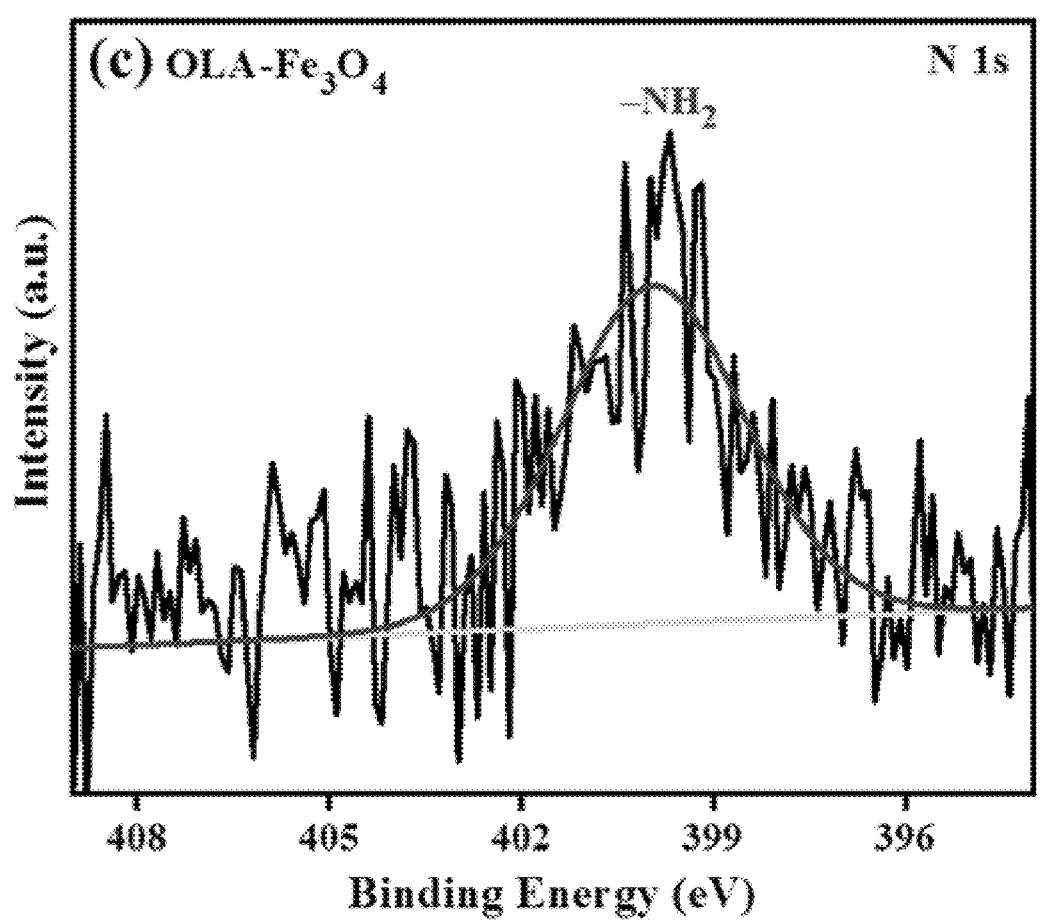
FIG. 3C. Observed (black line) and fitted (blue line) XPS spectra of N1s for OLA-$Fe_3O_4$. This figure depicts a symmetric peak with low intensity detected at 399.7 eV in the N1s spectrum attributed to —$NH_2$ group of OLA.
Figure 3D:
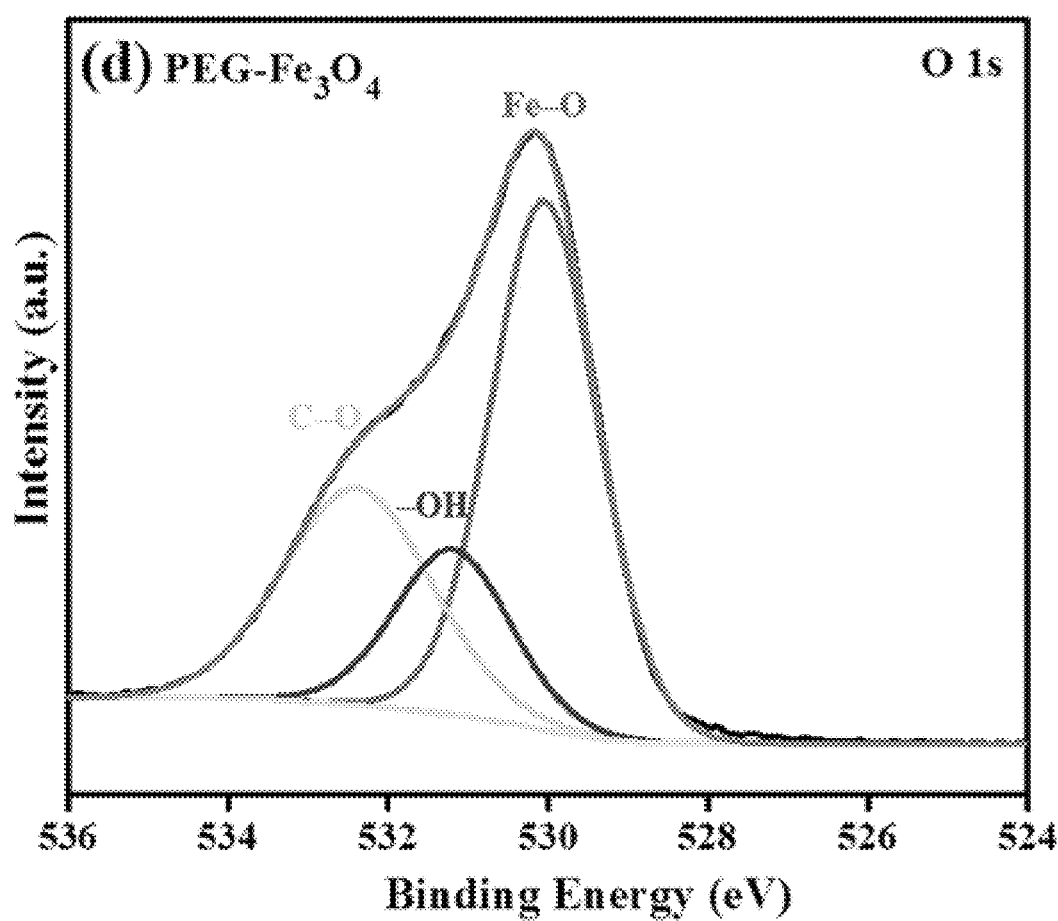
FIG. 3D. Deconvoluted high-resolution XPS spectra of the O1s component for PEG-$Fe_3O_4$; observed (black line), fitted (pink line), Fe—O (red line), —OH (blue line), and C—O (green line) spectra.
Figure 3E:
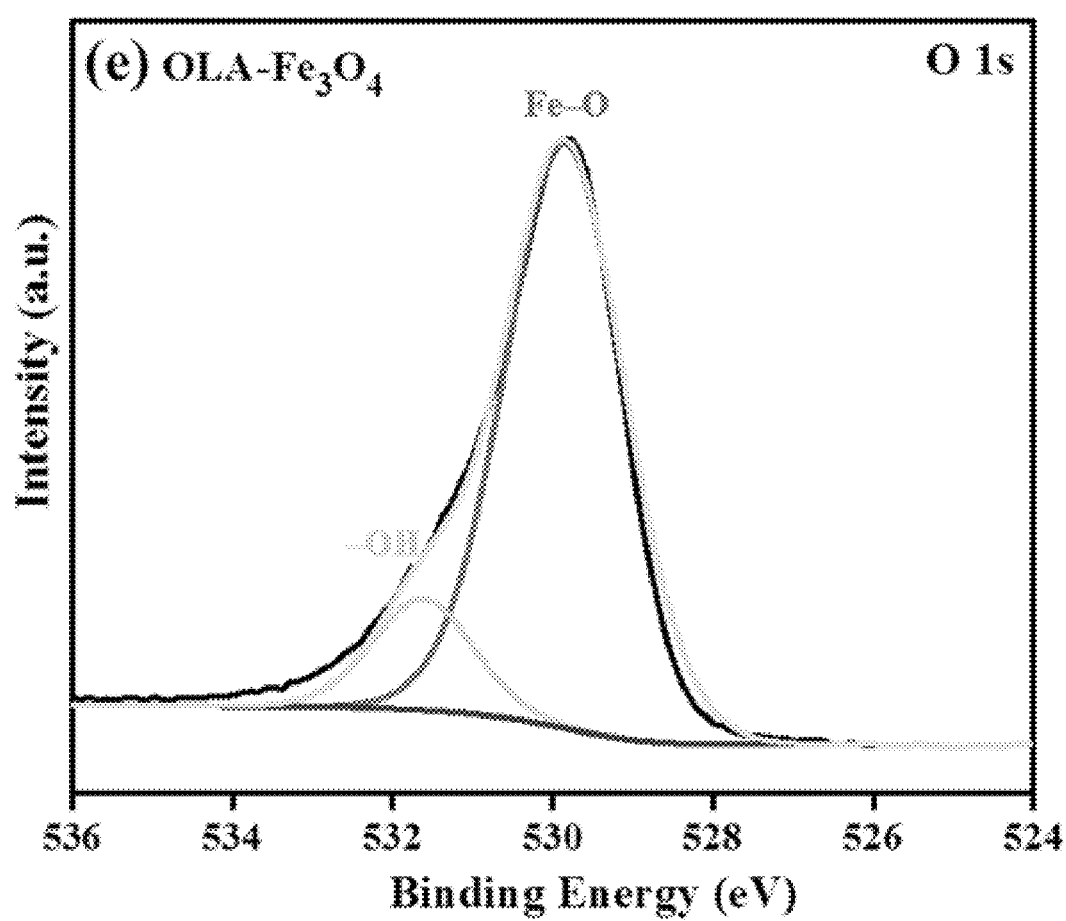
FIG. 3E. Deconvoluted high-resolution XPS spectra of the O1s component for OLA-$Fe_3O_4$; observed (black line), fitted (cyan line), Fe—O (red line), and —OH (green line) spectra.
Figure 3F:
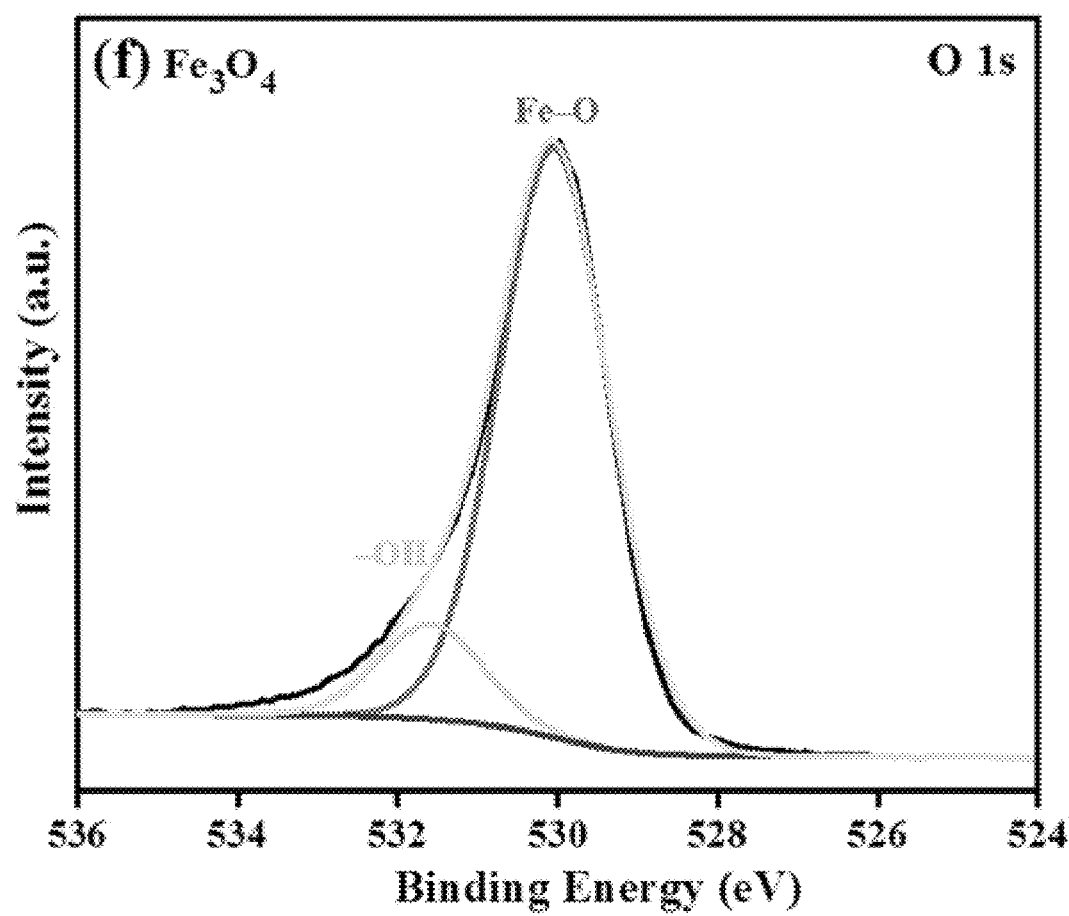
FIG. 3F. Deconvoluted high-resolution XPS spectra of the O1s component for $Fe_3O_4$; observed (black line), fitted (cyan line), Fe—O (red line), and —OH (green line) spectra.

The XPS profiles also give evidence for the presence of an amorphous coating on the surface of the NPs. The presence of amine (—$NH_2$) groups in XPS spectrum of OLA-$Fe_3O_4$ indicates surface functionalization of the NPs. It is reported that the binding-energy values corresponding to bonded amines are observed in the range 398-400 eV; M. Aslam, E. A. Schultz, T. Sun, T. Meade and V. P. Dravid, *Cryst. Growth Des.*, 2007, 7, 471-475. A symmetric peak with low intensity detected at 399.7 eV in the N1s spectrum (FIG. 3C) attributed to —$NH_2$ group of OLA in which nitrogen is coordinated with metal oxide NPs; W. Lu, M. Ling, M. Jia, P. Huang, C. Li and B. Yan, *Mol. Med. Rep.*, 2014, 9, 1080-1084. The observed binding-energy is consistent with the literature value for amine-capped NP; M. Aslam, E. A. Schultz, T. Sun, T. Meade and V. P. Dravid, *Cryst. Growth Des.*, 2007, 7, 471-475 and D. Wilson and M. Langell, *Appl. Surf Sci.*, 2014, 303, 6-13. FIGS. 3D-3F reveal the deconvoluted high-resolution XPS spectra of the O1s component for PEG-$Fe_3O_4$, OLA-$Fe_3O_4$, and $Fe_3O_4$, respectively. Two characteristic peaks observed in all O1s spectra at ~530.0 and ~531.6 eV belong to Fe—O of iron oxide NPs core (Y. V. Kolen'ko, et al., 2014, id) and hydroxyl group (—OH)), respectively. Additionally, a strong shoulder peak detected at 532.4 eV in O1s profile of PEG-$Fe_3O_4$ (FIG. 3D) assigned to C—O group of PEG-400 in which oxygen atoms are bonded to aliphatic carbon; D. Maity, et al., 2009, id. and B. Gupta, N. Kumar, K. Panda, A. A. Melvin, S. Joshi, S. Dash and A. K. Tyagi, *J. Phys. Chem. C*, 2016, 120, 2139-2148. The existence of Fe—O and C—O confirms the surface functionalization of $Fe_3O_4$ NPs with PEG groups.

DSC was further employed to investigate the organic surface coating, thermal stability and phase transformations of the magnetite NPs at elevated temperature. FIG. 4 shows the thermal behavior of uncoated and coated SPIONs in the temperature range of 20-500° C. From the DSC curve of uncoated-$Fe_3O_4$, it is quite clear that the NPs are almost thermally stable and no phase transformation is observed up to 500° C. under an $N_2$ environment. However, a small exothermic process observed in the temperature range 125-200° C. which could be attributed to the removal of hydroxyl (—OH) groups adsorbed during coprecipitation on the surface of uncoated-$Fe_3O_4$. In the case of coated NPs (PEG-$Fe_3O_4$ and OLA-$Fe_3O_4$), DSC curves show multi-step exothermic processes in the range of 150-400° C. with maxima at 279 and 275° C., which are attributed to the decomposition of organic capping agents, i.e., PEG-400 and OLA fractions, respectively; A. Mukhopadhyay, N. Joshi, K. Chattopadhyay and G. De, *ACS Appl. Mater. Interfaces*, 2011, 4, 142-149 and A. Monfared, A. Zamanian, M. Beygzadeh, I. Sharifi and M. Mozafari, *J. Alloys Compd.*, 2017, 693, 1090-1095. The observed thermal behavior of PEG-$Fe_3O_4$ and OLA-$Fe_3O_4$ confirmed the functionalization of SPIONs.

Surface Morphology and Particle Size Analysis.

Figure 5A:
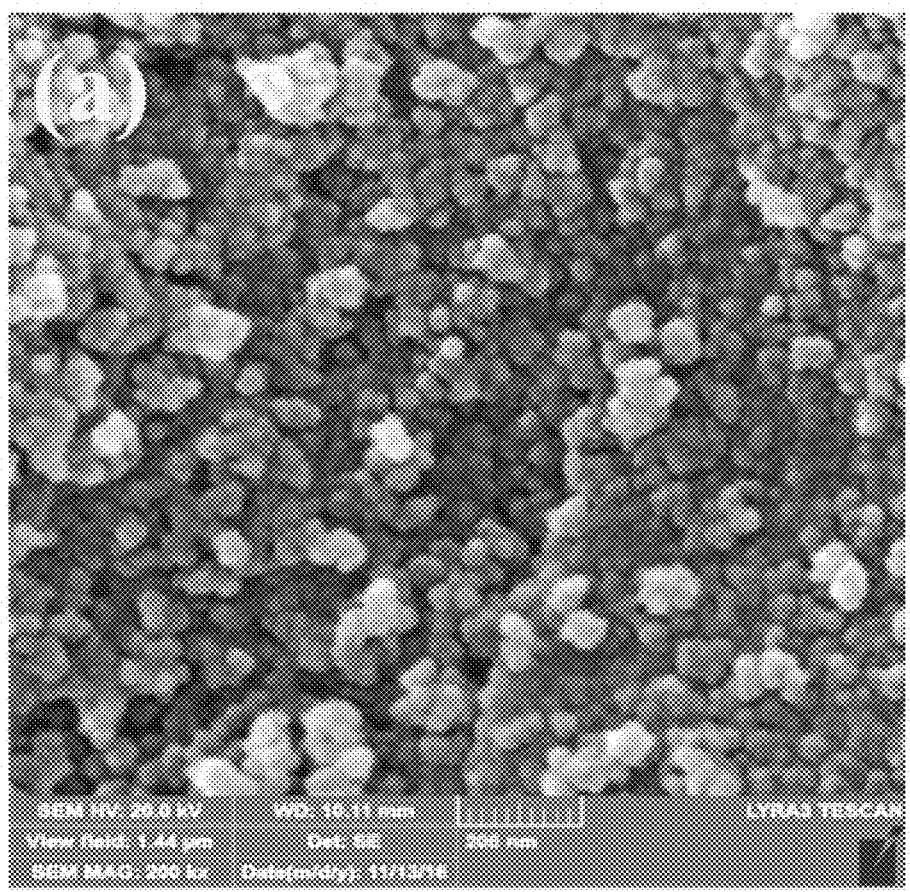
FIG. 5A. High-resolution FESEM image of PEG-$Fe_3O_4$.
Figure 5B:
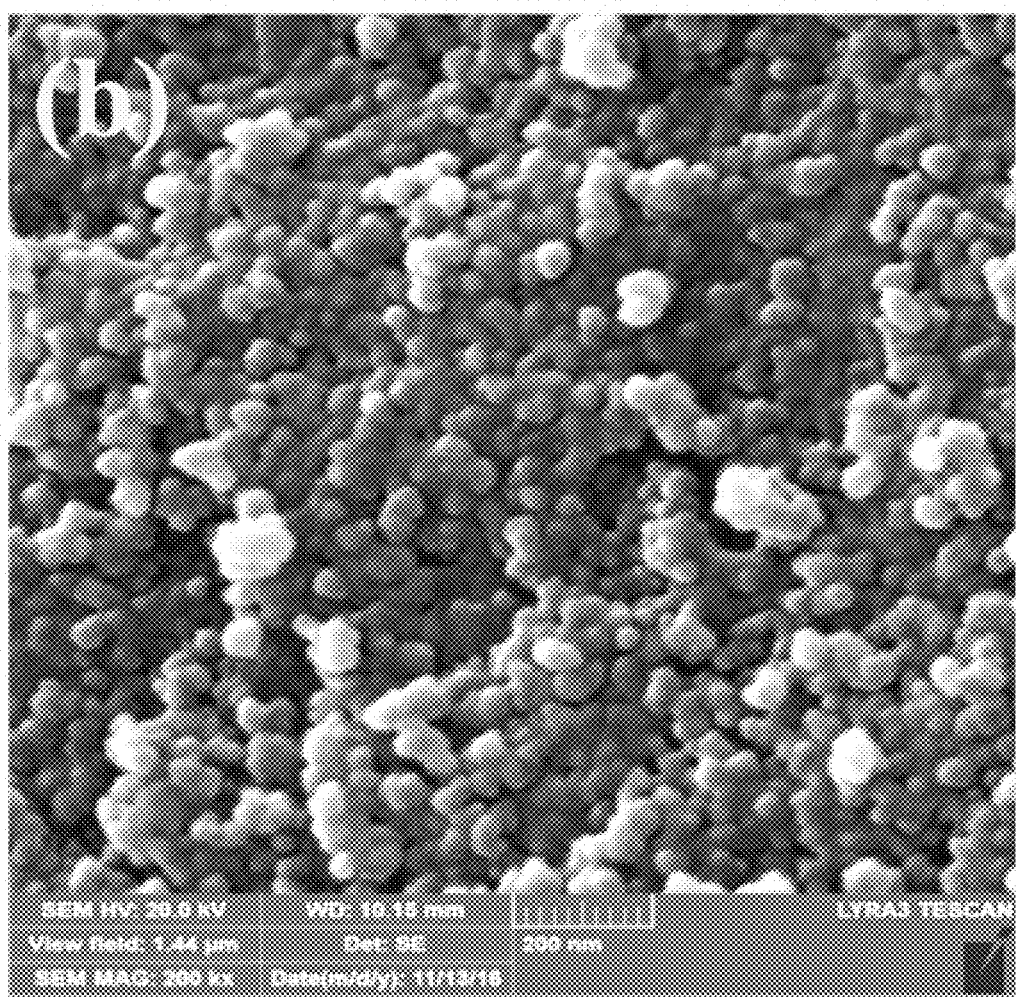
FIG. 5B. High-resolution FESEM image of OLA-$Fe_3O_4$.
Figure 5C:
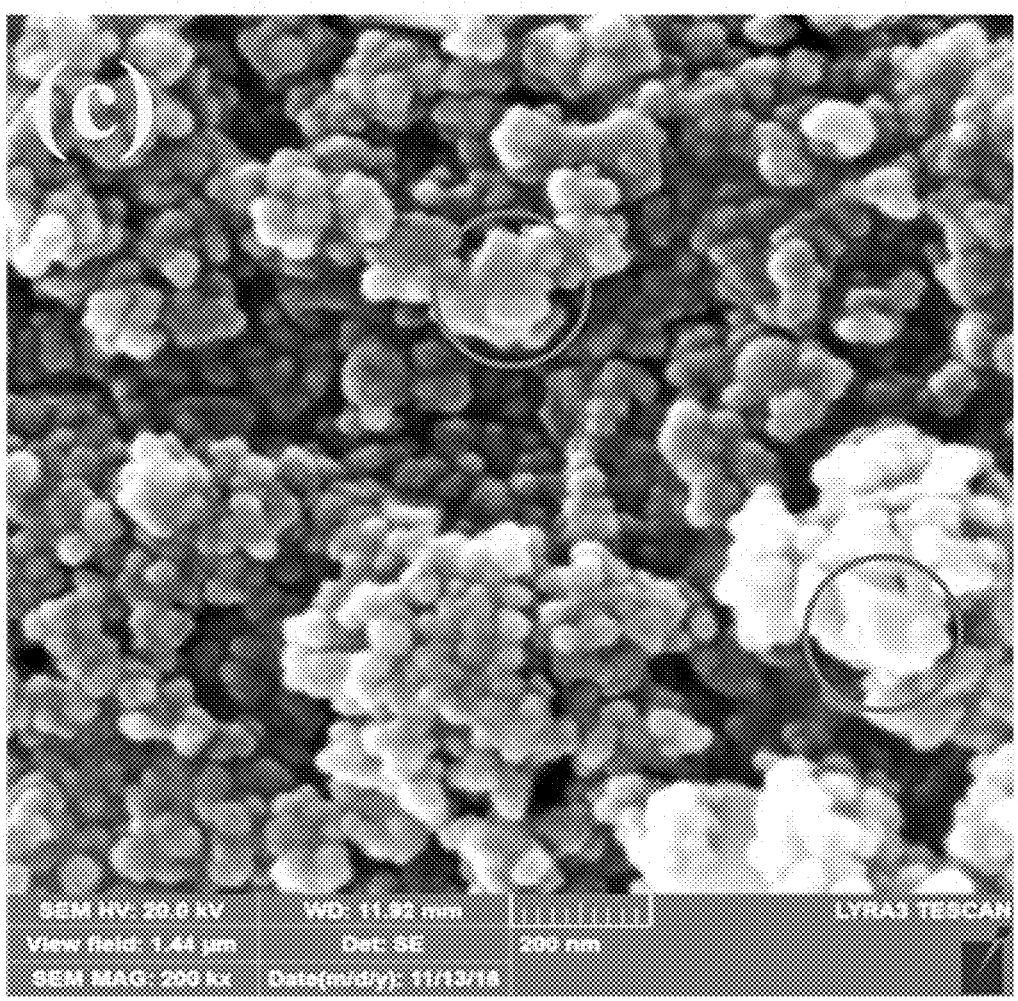
FIG. 5C. High-resolution FESEM image of $Fe_3O_4$ NPs.
Figure 8A:
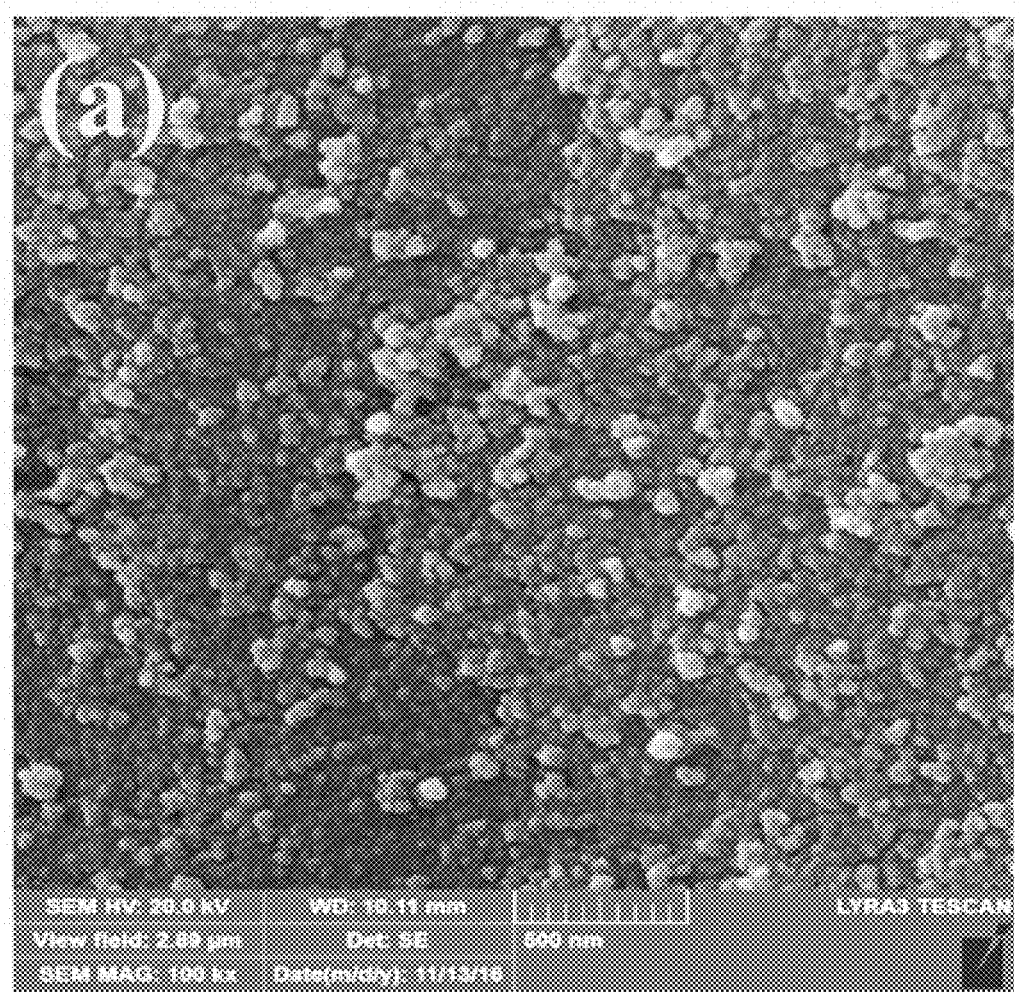
FIG. 8A. Low-resolution FESEM image of PEG-$Fe_3O_4$ NPs (SPIONs)
Figure 8B:
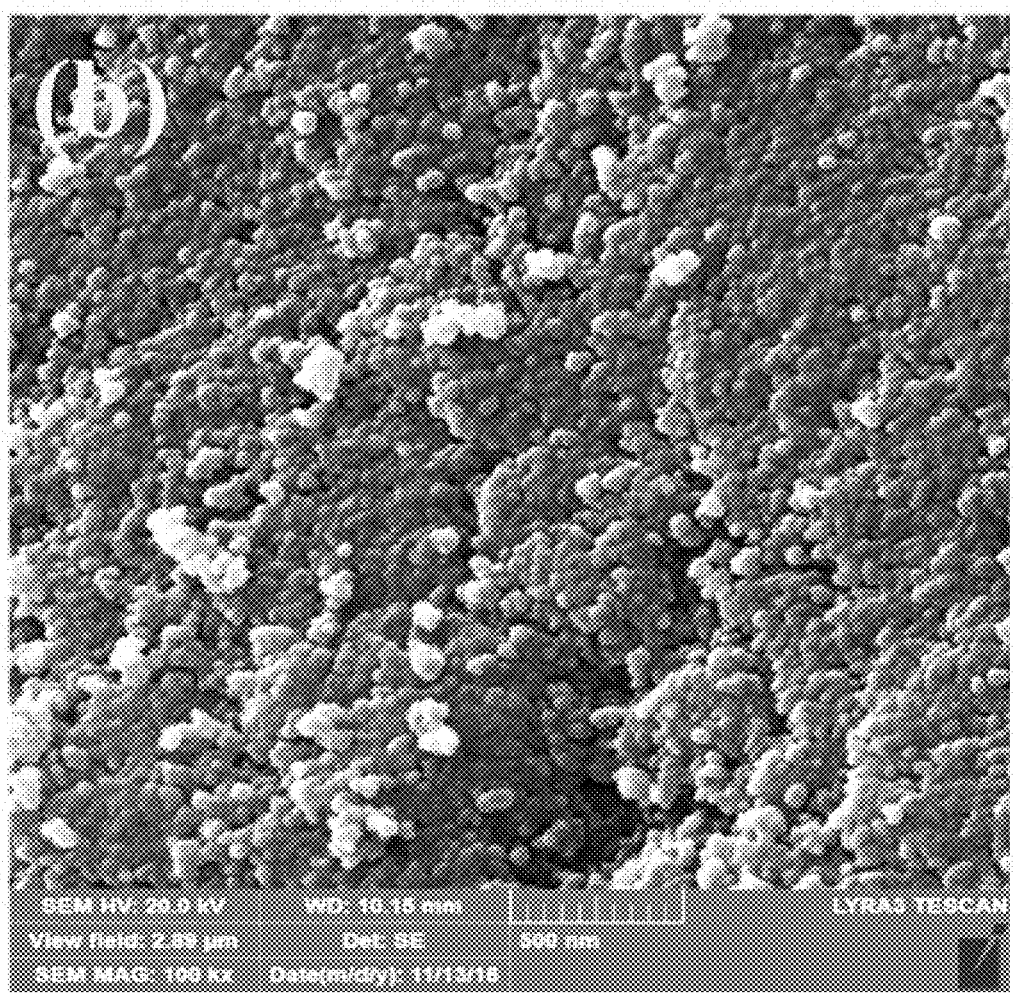
FIG. 8B. Low-resolution FESEM image of OLA-$Fe_3O_4$ NPs (SPIONs).
Figure 8C:
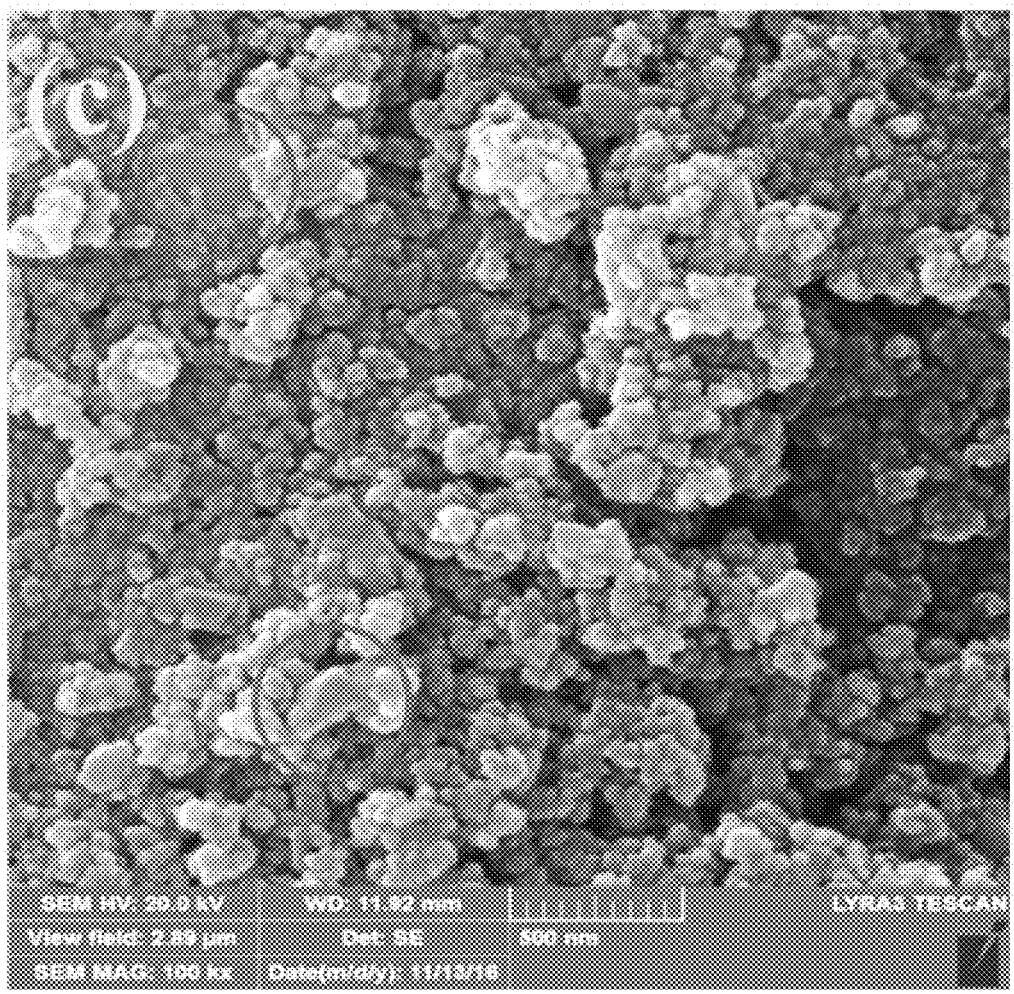
FIG. 8C. Low-resolution FESEM image of $Fe_3O_4$ NPs (SPIONs).
Figure 9A:
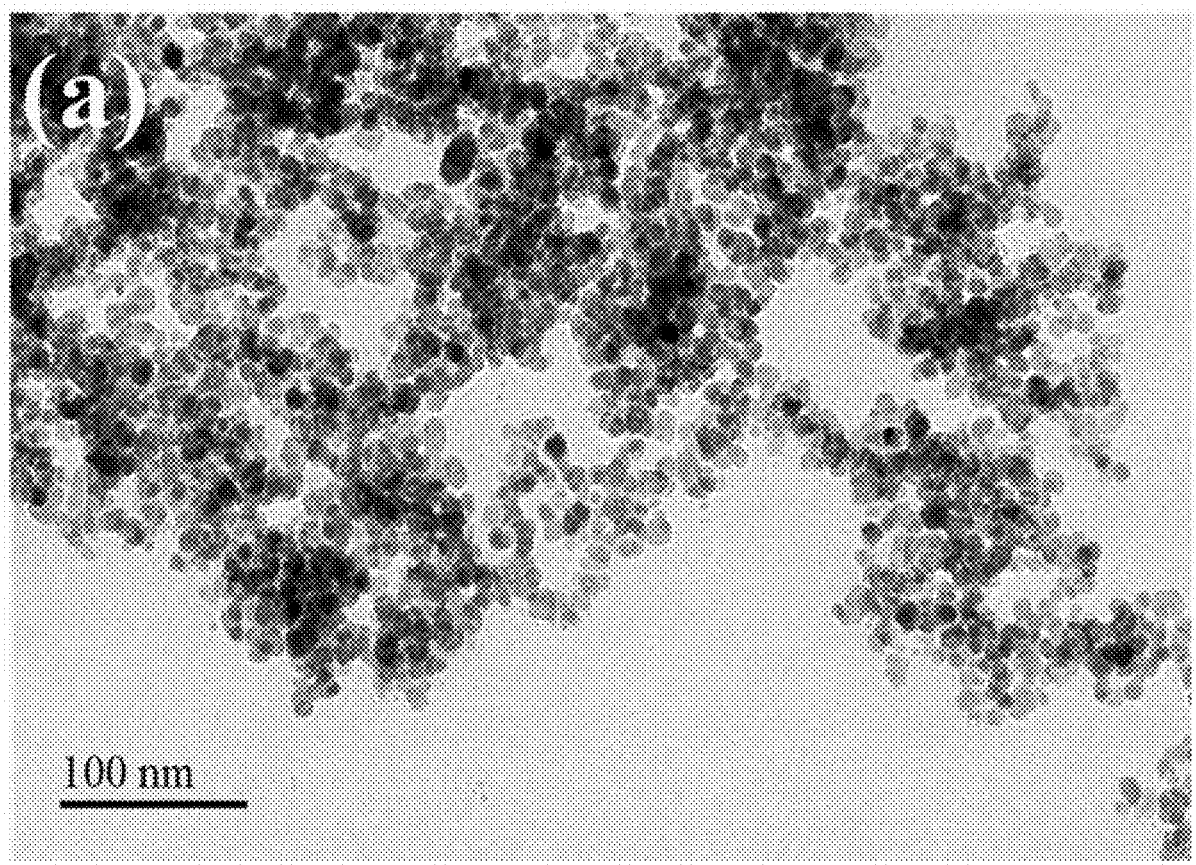
FIG. 9A. Low-resolution TEM image of PEG-$Fe_3O_4$ NPs (SPIONs).
Figure 9B:
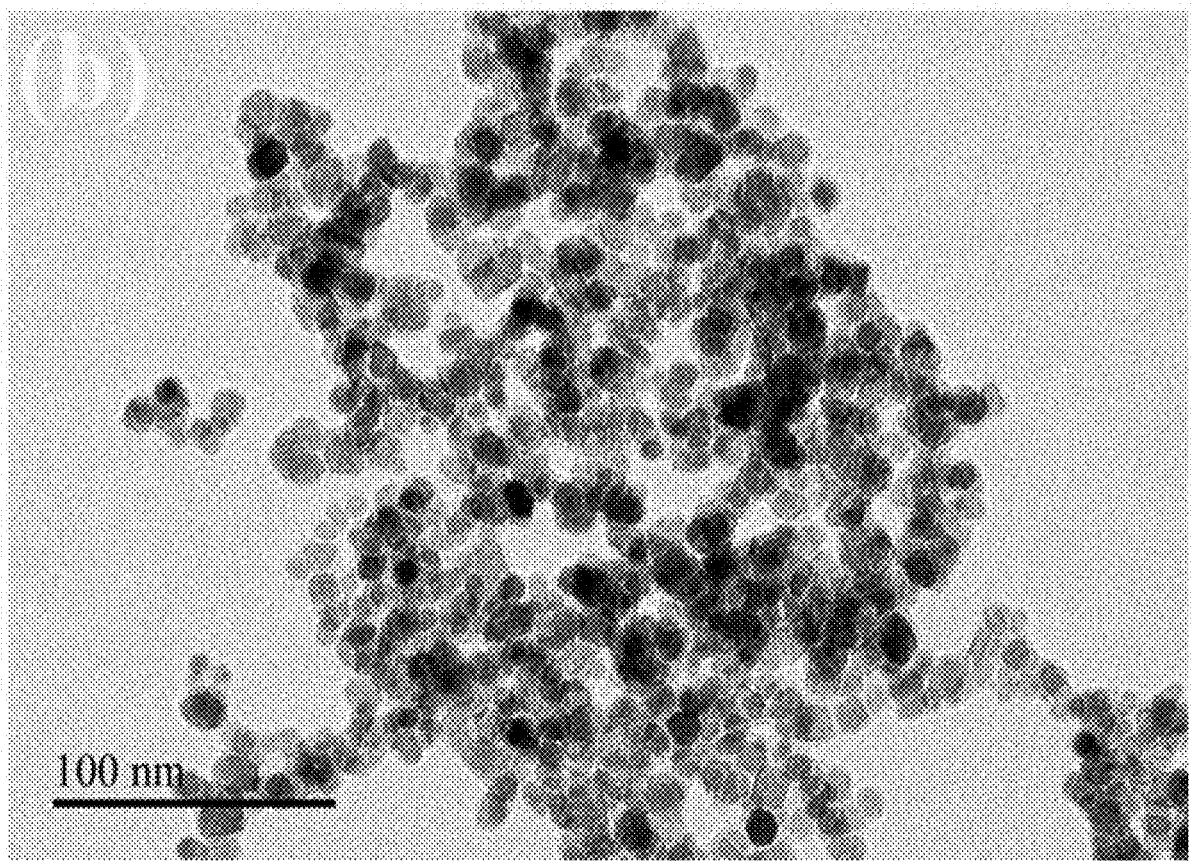
FIG. 9B. Low-resolution TEM image of OLA-$Fe_3O_4$ NPs (SPIONs).
Figure 9C:
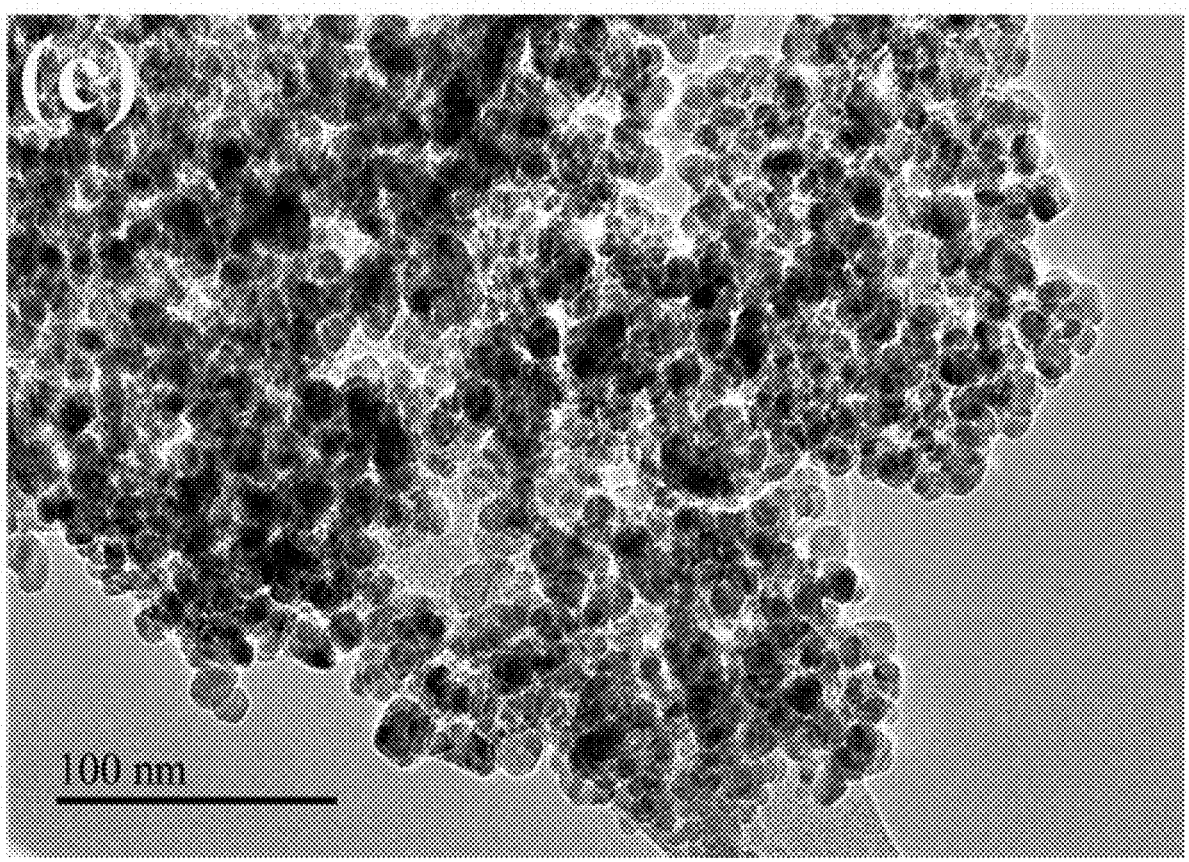
FIG. 9C. Low-resolution TEM image of $Fe_3O_4$ NPs (SPIONs).

Surface morphology and particle size of as-synthesized SPIONs were investigated via FESEM and TEM techniques. High and low-resolution FESEM images of (a) PEG-$Fe_3O_4$, (b) OLA-$Fe_3O_4$, and (c) $Fe_3O_4$ are shown in FIGS. 5 and 8, respectively. From the micrographs of PEG-$Fe_3O_4$ and OLA-$Fe_3O_4$, it can be clearly observed that the synthesized SPIONs have almost a spherical shape and single distribution. However, aggregation and lumps have been observed in the case of uncapped-$Fe_3O_4$ NPs synthesized by the coprecipitation method, as indicated by red circles in FIG. 5C.

The comparison indicates that the solvothermal protocol allows control of shape and size of NPs as compared to the coprecipitation method. Spherical shaped NPs are predominantly formed in the synthesis of $Fe_3O_4$ owing to the low surface area per unit volume, and hence minimum surface free-energy; D. K. Kim, M. Mikhaylova, Y. Zhang and M. Muhammed, *Chem. Mater.*, 2003, 15, 1617-1627. This is attributed the nucleation rate per unit area which is isotropic at the NP interfaces, which results in minimization of surface free-energy; D K. Kim, et al., 2003, id. Therefore, the equivalent growth rate in all directions of nucleation leads to the formation of high and low resolution TEM images of (a) PEG-$Fe_3O_4$, (b) OLA-$Fe_3O_4$, and (c) $Fe_3O_4$ are shown in FIGS. 6A-6C, FIGS. 8A-8C, and FIGS. 9A-9C, respectively. The images clearly indicate that PEG-$Fe_3O_4$ and OLA-$Fe_3O_4$ NPs exhibited spherical morphology and homogenous distributions, whereas uncoated-$Fe_3O_4$ NPs exhibit irregular shapes. The average particle diameter of as-synthesized NPs is 11.6±1.4, 12.7±2.2 and 9.1±3.0 for PEG-$Fe_3O_4$, OLA-$Fe_3O_4$, and $Fe_3O_4$, respectively (Table 1). The broad distribution observed for uncapped-$Fe_3O_4$ NPs indicates that the particle size was not well-controlled with the coprecipitation method. The comparison also indicates that particle diameters estimated from TEM images are consistent with average crystallite sizes observed from XRD. The selected area electron diffraction (SAED) patterns of (d) PEG-$Fe_3O_4$, (e) OLA-$Fe_3O_4$, and (f) $Fe_3O_4$ SPIONs (FIG. 6A-6F) are consistent with XRD profiles (FIG. 2) and literature; A. Mukhopadhyay, et al., 2011, id. The SAED patterns also exhibit structural homogeneity and a high degree of crystallinity of the synthesized NPs. The patterns are indexed based on cubic inverse spinel structure with Fd-3m space group and unit cell parameters of magnetite NPs (Table 1).

Growth Mechanism of SPIONs.

The possible growth mechanism of these as-synthesized SPIONs is proposed below. The PEG-400 and OLA can be considered high-boiling solvents playing three roles (reducing, stabilizing, and capping agents) in the solvothermal synthesis of SPIONs. The mechanism of $Fe_3O_4$ NPs formation may become more complicated when metal-organic salts Fe(acac)$_3$ are used as precursors. At an elevated temperature, Fe(acac)$_3$ precursor decomposes and liberate $Fe^{3+}$ ions. PEG-400 and OLA are oxidized at high temperature and generate electrons reducing $Fe^{3+}$ to $Fe^{2+}$. PEG-400 is a stronger reducing agent and generates $Fe_3O_4$ NPs at a relatively low temperature (e.g., 180° C.), whereas OLA, being a mild reducing agent generates the NPs at a relatively higher temperature (e.g., 280° C.). These organic solvent/additives effectively controlled the particle growth and prevented aggregation. Spherical-shaped NPs were predominantly formed due to the minimum surface free-energy.

However, the synthesis of SPIONs by the coprecipitation method using $Fe^{3+}$ and $Fe^{2+}$ ions was pH-dependent based on the following chemical reaction (F. Sayar, G. Güven and E. Pişkin, *Colloid Polym. Sci.*, 2006, 284, 965):

$$2\ Fe^{3+} + Fe^{2+} + 8\ OH^- \rightarrow Fe_3O_4 + 4H_2O \quad (1)$$

According to above equation (1), a complete co-precipitation of $Fe_3O_4$ NPs was observed for pH above 7, while also keeping the molar ratio (2:1) between $Fe^{3+}$ and $Fe^{2+}$ under a non-oxidizing environment. In this case, pH was adjusted to ~9.0 using $NH_4OH$ as a precipitating agent and the NPs were stabilized with tetramethylammonium hydroxide solution.

$T_2$-Relaxation and Relaxometric Studies.

Spin-spin relaxation NMR ($T_2$-relaxation) measurements were performed to investigate the possibility employing these SPIONs as $T_2$-contrast agents for oil reservoir applications. The measurements were carried out for various concentrations of Fe in the as-synthesized SPIONs as shown in FIGS. 7A-7D.

estimated from the slope of equation (2); N. Arsalani, H. Fattahi and M. Nazarpoor, *Express Polym Lett*, 2010, 4, 329-338.

$$1/T_2 = 1/T_2^\circ + r_2[Fe] \quad (2)$$

Where, $T_2$, $T_2^\circ$, $r_2$, and [Fe] are the relaxation time of NPs dispersion, pure solvent, transversal relaxivity and iron concentration (mM). The estimated $r_2$ values were found to be 66.7, 49.0, and 32.2 $mM^{-1}\ s^{-1}$ for $PEG-Fe_3O_4$, $OLA-Fe_3O_4$, and $Fe_3O_4$ SPIONs respectively.

The higher $r_2$ values for $PEG-Fe_3O_4$ and $OLA-Fe_3O_4$ indicated that the capped-$Fe_3O_4$ showed excellent relaxivity properties owing to their higher dispersion in the respective media as compared to uncapped $Fe_3O_4$.

The estimated $r_2$ value for $PEG-Fe_3O_4$ was competitive with the commercial contrasting agents such as SHU-555C ($r_2$=69 $mM^{-1}\ s^{-1}$) and 10 times higher than Gd-DTPA ($r_2$=5.3 $mM^{-1}\ s^{-1}$)[19]. A comparison of various $T_2$-contrast agents is provided in Table 2.

TABLE 2

Comparison of various $T_2$-contrast agents for MRI applications.

| Sample composition | Synthesis method | Colloidal stability | Particle size (nm) | Field strength (T) | $r_2$ ($mMs^{-1}$) | Refs. |
|---|---|---|---|---|---|---|
| $Fe_3O_4$ | Polyol | $H_2O$, PBS | 8 | 1.5 | 82.7 | A |
| USMIO-$Fe_3O_4$ | Coprecipitation | $H_2O$ | 6.6 | 0.47 | 33.9 | B |
| MION-$Fe_3O_4$ | Coprecipitation | — | 4.6 | — | 34.8 | C |
| USPIO-$Fe_3O_4$ | Coprecipitation | 0.9% saline | 4.9 | 0.47 | 53.1 | D |
| US-$Fe_3O_4$ | Coprecipitation | pH: 5.3-8.5 | 4.6 | 7 | 64.4 | E |
| US-$Fe_3O_4$ | Coprecipitation | pH: 5.3-8.5 | 2.2 | 7 | 28.6 | E |
| PEG-$Fe_3O_4$ | Solvothermal | $H_2O$, seawater | 11.6 | 1.5 | 66.7 | Inv. |
| OLA-$Fe_3O_4$ | Solvothermal | $H_2O$, seawater | 12.7 | 1.5 | 49.0 | Inv. |

US: Ultra-small, MIO: Magnetic iron oxide, PIO: Paramagnetic iron oxide, PBS: Phosphate buffered saline.
Inv = invention. A = J. Wan, W. Cai, X. Meng and E. Liu, *Chem. Commun.* (*Cambridge, U.K.*), 2007, 5004-5006. B = E. V. Groman, J. C. Bouchard, C. P. Reinhardt and D. E. Vaccaro, *Bioconjugate Chem.*, 2007, 18, 1763-1771. C = T. Shen, R. Weissleder, M. Papisov, A. Bogdanov and T. J. Brady, *Magn. Reson. Med.*, 1993, 29, 599-604. D = H. K. Pannu, K. P. Wang, T. L. Borman and D. A. Bluemke, *J. Magn. Reson. Imaging*, 2000, 12, 899-904. E = G. Wang, X. Zhang, A. Skallberg, Y. Liu, Z. Hu, X. Mei and K. Uvdal, *Nanoscale*, 2014, 6, 2953-2963.

Before $T_2$-measurements, the Fe contents present in the samples were estimated with the help of ICP-AES analysis and were determined to be 57.9, 61.5 and 68.8 wt % of Fe content for $PEG-Fe_3O_4$, $OLA-Fe_3O_4$, and $Fe_3O_4$, respectively. Six concentrations of Fe (mM), i.e., 0.012, 0.024, 0.060, 0.12, 0.24 and 0.48 were prepared to determine the relaxometric properties of hydrophilic and hydrophobic samples in ASW and model oil, respectively.

$T_2$-relaxation measurements of (a) $PEG-Fe_3O_4$, (b) $OLA-Fe_3O_4$, and (c) $Fe_3O_4$ SPIONs with respect to Fe concentration are shown in FIGS. 7A-7D. A significant quenching of $T_2$-relaxation signals was observed with increasing concentrations of SPIONs. For comparison, $T_2$-relaxation curves and relaxation times of pure DI water, ASW, cyclohexane, hexadecane, and model oil are shown by FIG. 10.

The relaxation process took place due to energy exchange between neighboring protons in solvent molecules. SPIONs induced inhomogeneity in the presence of an applied magnetic field, which resulted in the de-phasing of magnetic moments of protons and led to the quenching of the $T_2$ signal. This decrease in $T_2$-relaxation time with Fe concentration indicates that these NPs can act as $T_2$-contrast agents for oil reservoir applications.

Figure 7A:
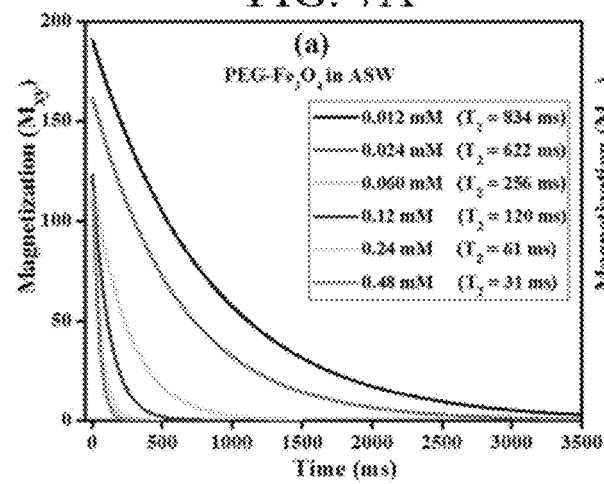
FIGS. 7A-7C show $T_2$-relaxation curves observed for various Fe concentrations of PEG-$Fe_3O_4$ SPIONs (in artificial seawater), OLA-$Fe_3O_4$ SPIONs (in oil), and $Fe_3O_4$ SPIONs (in artificial seawater), respectively.
Figure 7B:
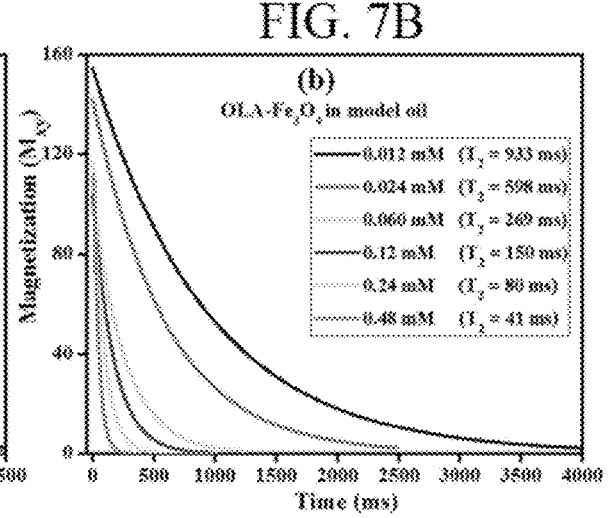
Figure 7C:
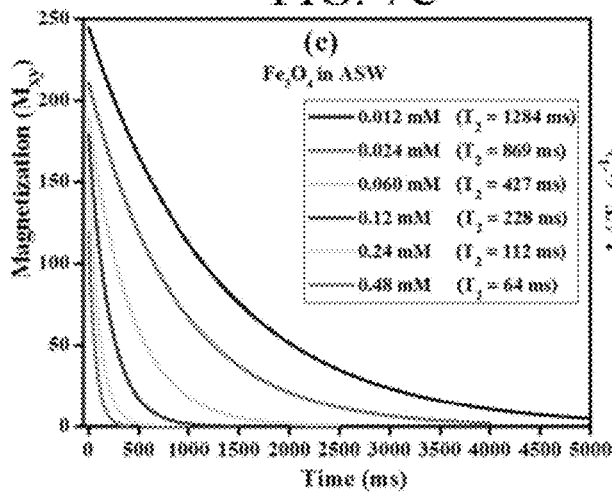
Figure 7D:
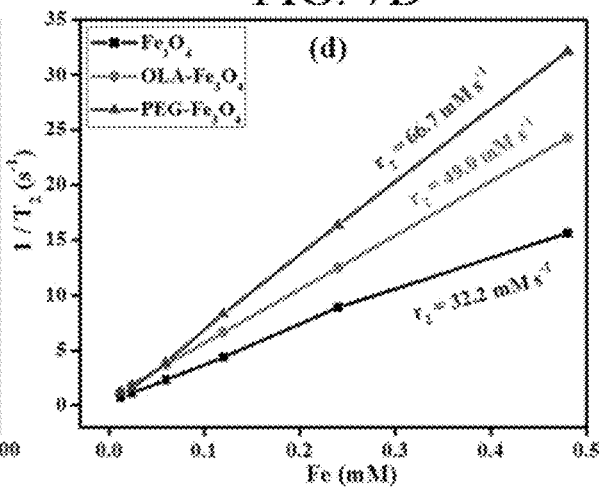
FIG. 7D shows an inverse of relaxation time (1/$T_2$) versus Fe concentration of as-synthesized SPIONs. Top line=PEG-$Fe_3O_4$ ($r_2$=66.7 mMs$^{-1}$); middle line=OLA-$Fe_3O_4$ ($r_2$=49.0 mMs$^{-1}$); and bottom line ($r_2$=32.2 mMs$^{-1}$)=$Fe_3O_4$.

The relaxivity properties were investigated by plotting various Fe concentration (mM) against relaxation time ($1/T_2$, $s^{-1}$), as shown in FIG. 7D. The $r_2$ value can be These outcomes suggest that theses functionalized SPIONs can be effectively used as $T_2$-contrast agents for reservoir applications due to their excellent relaxivity properties.

As shown herein, highly-stable hydrophilic and hydrophobic SPIONs contrast agents were successfully prepared using a single-step solvothermal method. Hydrophilic and hydrophobic characteristics were induced on the surfaces of the magnetite NPs by adsorbing either PEG-400 or OLA, respectively. The additives (PEG-400 and OLA) played three roles, i.e., as reducing, stabilizing, and capping agents during the synthesis processes.

The hydrophilic and hydrophobic SPIONs were found to be stable in ASW (36.03 $gL^{-1}$ salt in distilled water) and model oil (cyclohexane-hexadecane 1:1), respectively, which is a requirement for efficient use in a harsh oil reservoir environment.

The magnetite phase having cubic inverse spinel structure with Fd-3m space group was confirmed by XRD.

The surface functionalization of capped-NPs was established by the presence of C—O and —$NH_2$ groups in XPS spectra. TEM images demonstrated the spherical shape of as-synthesized NPs having ultra-small diameters <15 nm, which is a suitable size for passing through reservoir rock cores.

The suitability of NMR $T_2$-relaxation as a measurement tool, i.e., miniaturized acorn area analyzer in this case was successfully demonstrated here for the first time for oil reservoir applications.

The estimated $r_2$ value for PEG-Fe$_3$O$_4$ (66.7 mM$^{-1}$ s$^{-1}$) is competitive with the commercial contrasting agents such as SHU-555C ($r_2$=69 mM$^{-1}$ s$^{-1}$) and higher than Gd-DTPA ($r_2$=5.3 mM$^{-1}$ s$^{-1}$) (Z. Li, et al., 2012, id.) as well as reported values in literature (Table 2).

The observed excellent relaxivity properties due to their ultra-small sizes and long-term stability in the respective medium show these hydrophilic and hydrophobic SPIONs to be useful $T_2$-contrast agents for oil reservoir applications. Moreover, these properties are consistent with their utility as contrast agents for MRI and nanosensors for remote interrogation in both biomedical and oil reservoir applications.

Terminology.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology. As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A method for making hydrophilic-$Fe_3O_4$ superparamagnetic iron oxide nanoparticles (SPIONs), comprising:
   mixing an iron-containing precursor with a hydrophilic ligand or capping agent to form a homogeneous suspension;
   heating the homogenous suspension to a temperature sufficient to bind the hydrophilic ligand to the iron-containing precursor,
   cooling the resulting homogenous suspension,
   adding a solvent to the cooled homogeneous suspension to precipitate hydrophilic-$Fe_3O_4$ SPIONs into a slurry,
   separating the precipitated hydrophilic-$Fe_3O_4$ SPIONs from the slurry, and
   washing the hydrophilic-$Fe_3O_4$ SPIONs to remove unbound hydrophilic ligands or capping agent, thereby making the hydrophilic-$Fe_3O_4$ SPIONs
   wherein the iron-containing precursor is iron(III) acetylacetonate, the hydrophilic ligand or capping agent is polyethylene glycol 400 (PEG-400), the heating is at a pressure of about 15 to about 45 psi and at a temperature ranging from 175 to 185° C. for at least 12 hours, the solvent is a mixture of absolute ethanol and diethylether, and the hydrophilic-$Fe_3O_4$ SPIONs are washed in ethanol.

2. The method of claim 1 that is a solvothermal method wherein the hydrophilic ligands or capping agents participate in reducing, stabilizing and capping of the hydrophilic-$Fe_3O_4$ SPIONs produced.

3. The method of claim 1, wherein the heating is performed in an autoclave or other closed controlled environment at a pressure ranging from about 15 to about 80 psi.

4. A method for making hydrophobic-$Fe_3O_4$ superparamagnetic iron oxide nanoparticles (SPIONs), comprising:
   mixing an iron-containing precursor with a hydrophobic ligand or capping agent to form a homogeneous suspension;
   heating the homogenous suspension to a temperature sufficient to bind the hydrophobic ligand or capping agent with the iron-containing precursor,
   cooling the homogenous suspension,
   adding a solvent to precipitate hydrophobic-$Fe_3O_4$ SPIONs into a slurry,
   separating hydrophobic-$Fe_3O_4$ SPIONs from the slurry, and
   washing the hydrophobic-$Fe_3O_4$ SPIONs to remove unbound hydrophobic ligand or capping agent, thereby making the hydrophobic-$Fe_3O_4$ SPIONs,
   wherein the iron-containing precursor is iron(III) acetylacetonate, the hydrophobic ligand or capping agent is oleylamine (OLA), the heating is at a pressure of 40 to 80 psi and at temperature ranging from 275 to 285° C. for at least 12 hours, the solvent is a mixture of absolute ethanol and diethylether, and the hydrophobic-$Fe_3O_4$ SPIONs are washed in ethanol.

5. The method of claim 4 that is a solvothermal method wherein the hydrophobic ligands or capping agents participate in reducing, stabilizing and capping of the hydrophobic-$Fe_3O_4$ SPIONs produced.

6. The method of claim 4, wherein the heating is performed in an autoclave or other closed controlled environment at a pressure ranging from about 15 to about 80 psi.

* * * * *